United States Patent
Yamamoto

(10) Patent No.: US 6,259,702 B1
(45) Date of Patent: *Jul. 10, 2001

(54) SERVER SYSTEM FOR DELIVERING SIGNAL AND DELIVERY METHOD OF SIGNAL THEREIN

(75) Inventor: Mitsuru Yamamoto, Yokohama (JP)

(73) Assignee: Canon Kabushiki Kaisha, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/951,322

(22) Filed: Oct. 16, 1997

(30) Foreign Application Priority Data

Oct. 18, 1996 (JP) .................................................. 8-276094
Oct. 3, 1997 (JP) .................................................. 9-271254

(51) Int. Cl.[7] ............................. H04J 12/40; H04J 14/02
(52) U.S. Cl. ............................................ 370/437; 359/128
(58) Field of Search .................................... 359/124, 125, 359/126, 127, 128, 129, 130, 131, 134, 174, 175, 176, 179; 370/432, 430, 437, 436, 412, 414, 535, 537, 474

(56) References Cited

U.S. PATENT DOCUMENTS

| 5,365,344 | * | 11/1994 | Eda et al. ............................. 359/124 |
| 5,477,362 | * | 12/1995 | Okamoto et al. ..................... 359/123 |
| 5,504,609 | * | 4/1996 | Alexander et al. ................... 359/125 |
| 5,541,657 | * | 7/1996 | Yamamoto et al. .................. 348/388 |
| 5,559,910 | * | 9/1996 | Taga et al. ............................... 385/24 |
| 5,581,386 | * | 12/1996 | Suzuki ................................... 359/117 |
| 5,644,423 | * | 7/1997 | Iwano ................................... 359/337 |
| 5,699,177 | * | 12/1997 | Yamamoto ........................... 359/125 |
| 5,726,784 | * | 3/1998 | Alexander et al. ................... 359/125 |
| 5,751,455 | * | 5/1998 | Shibutani et al. ..................... 359/126 |
| 5,777,764 | * | 7/1998 | Kohn ..................................... 359/133 |
| 5,784,184 | * | 7/1998 | Alexander et al. ................... 359/125 |
| 5,796,501 | * | 8/1998 | Sotom et al. .......................... 359/119 |
| 5,796,957 |   | 8/1998 | Yamamoto et al. ............. 395/200.81 |
| 5,798,858 | * | 8/1998 | Bodeep et al. ........................ 359/191 |
| 5,812,290 | * | 9/1998 | Maeno et al. ......................... 359/117 |
| 5,848,240 |   | 12/1998 | Yamamoto ...................... 395/299.43 |
| 5,850,303 | * | 12/1998 | Yamamoto et al. .................. 359/133 |
| 5,859,718 | * | 1/1999 | Yamamoto et al. .................. 359/128 |

* cited by examiner

Primary Examiner—Chau Nguyen
Assistant Examiner—Chiho Andrew Lee
(74) Attorney, Agent, or Firm—Fitzpatrick, Cella, Harper & Scinto

(57) ABSTRACT

The present application concerns a server system for delivering signals. Particularly, the application concerns a server system capable of efficiently delivering continuous signals. In the present invention a plurality of reproducing devices are used and connection thereof with a plurality of channels is successively altered so that plural reproducing devices are not connected to one channel simultaneously. This alteration is always carried out or this alteration is carried out according to a pattern preliminarily set so that plural reproducing devices are not connected to one channel simultaneously, whereby upon start of delivery to a certain channel, the delivery can be started without consideration on the delivery conditions of signals to the other channels at that time.

18 Claims, 21 Drawing Sheets

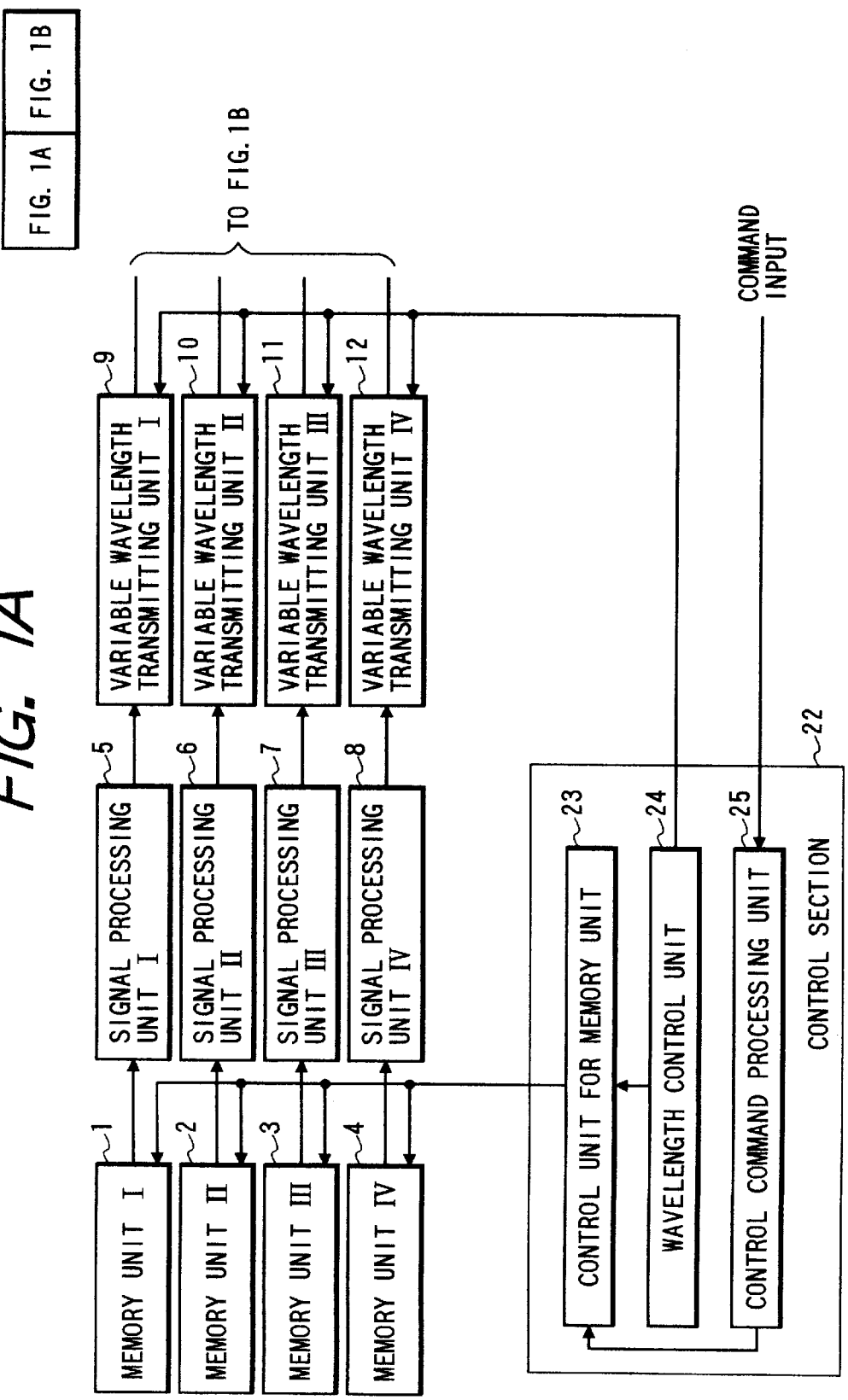

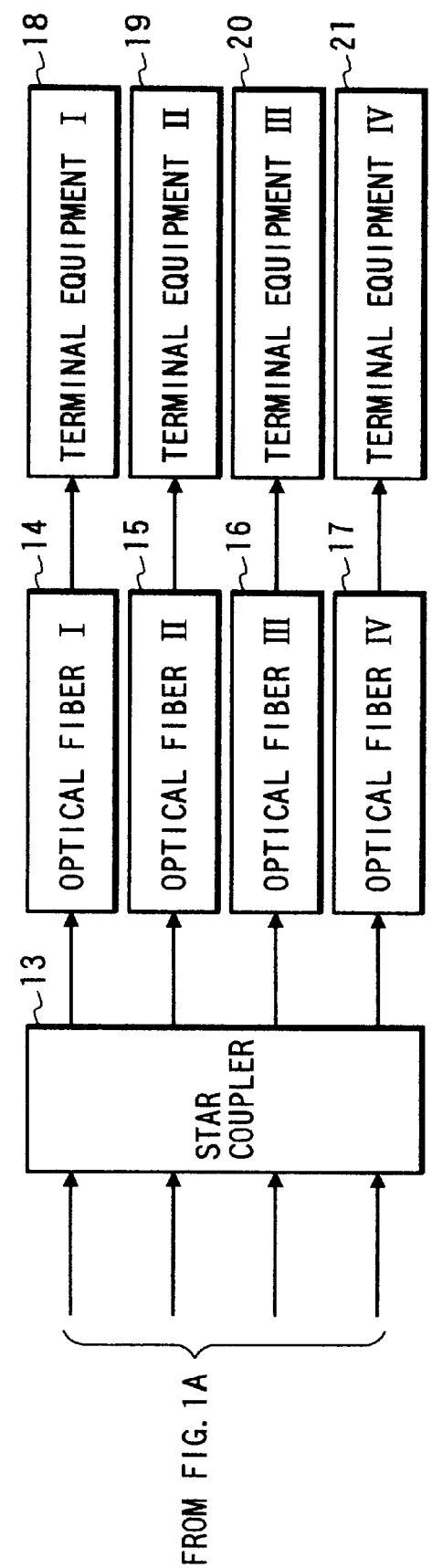

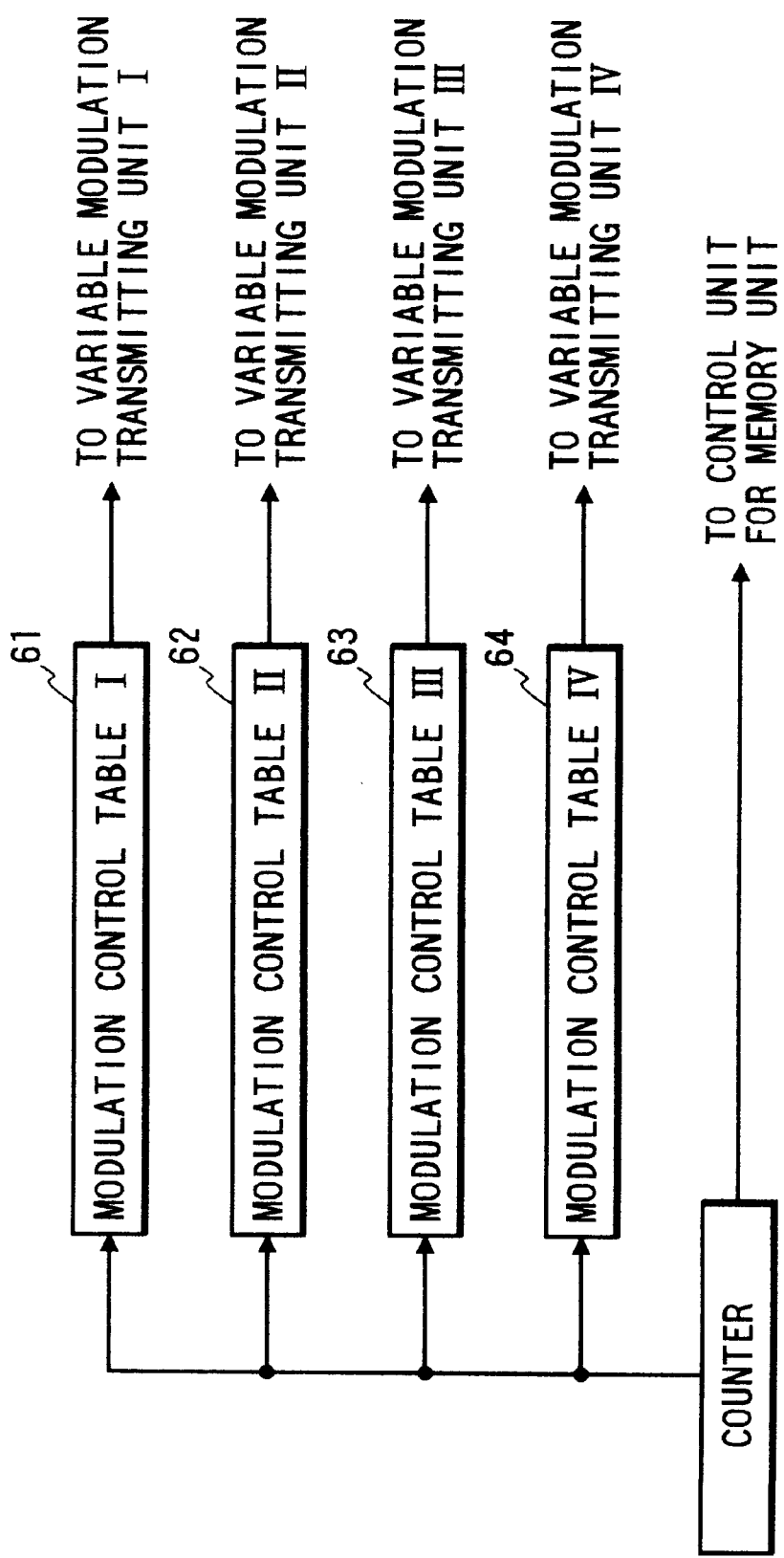

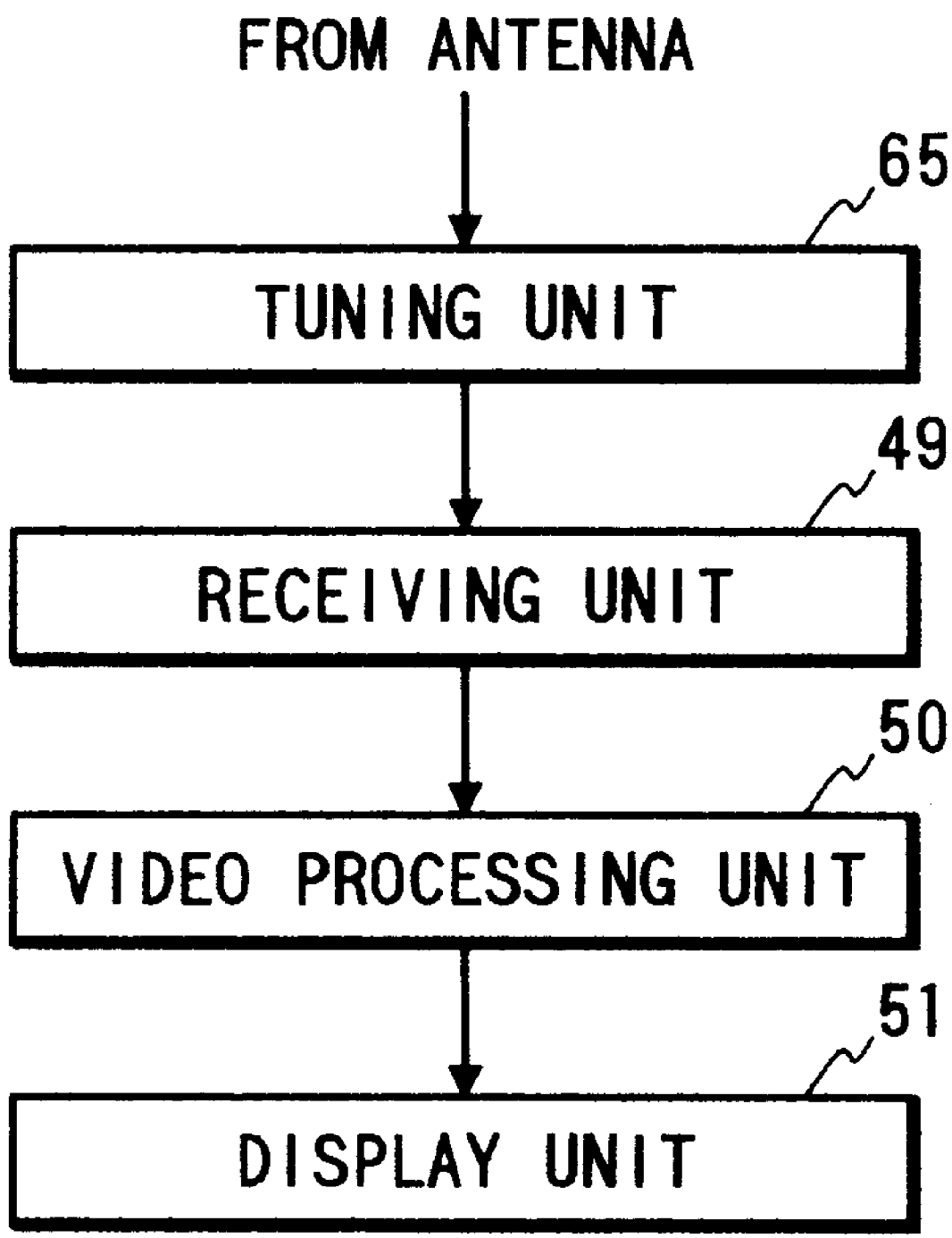

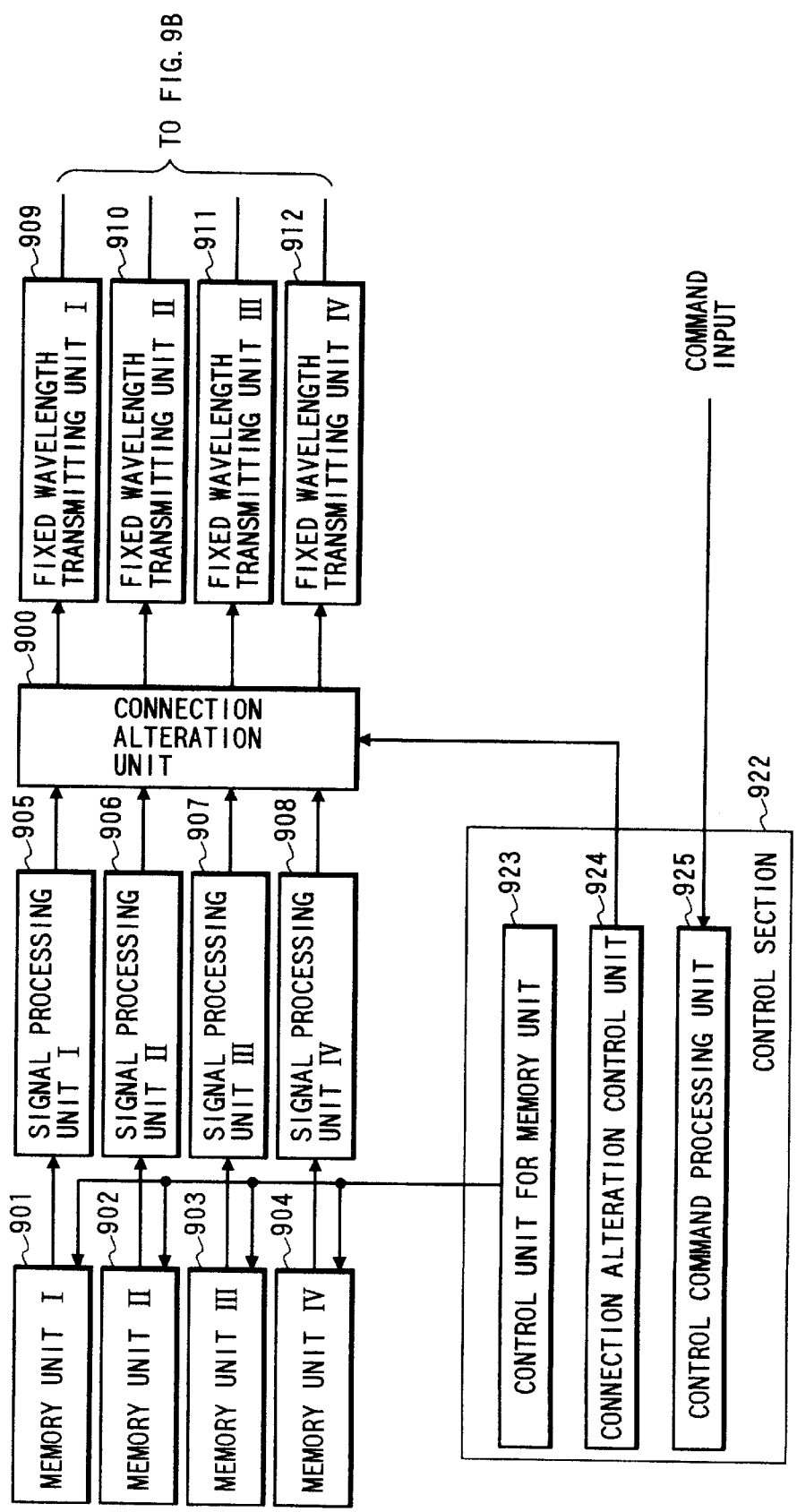

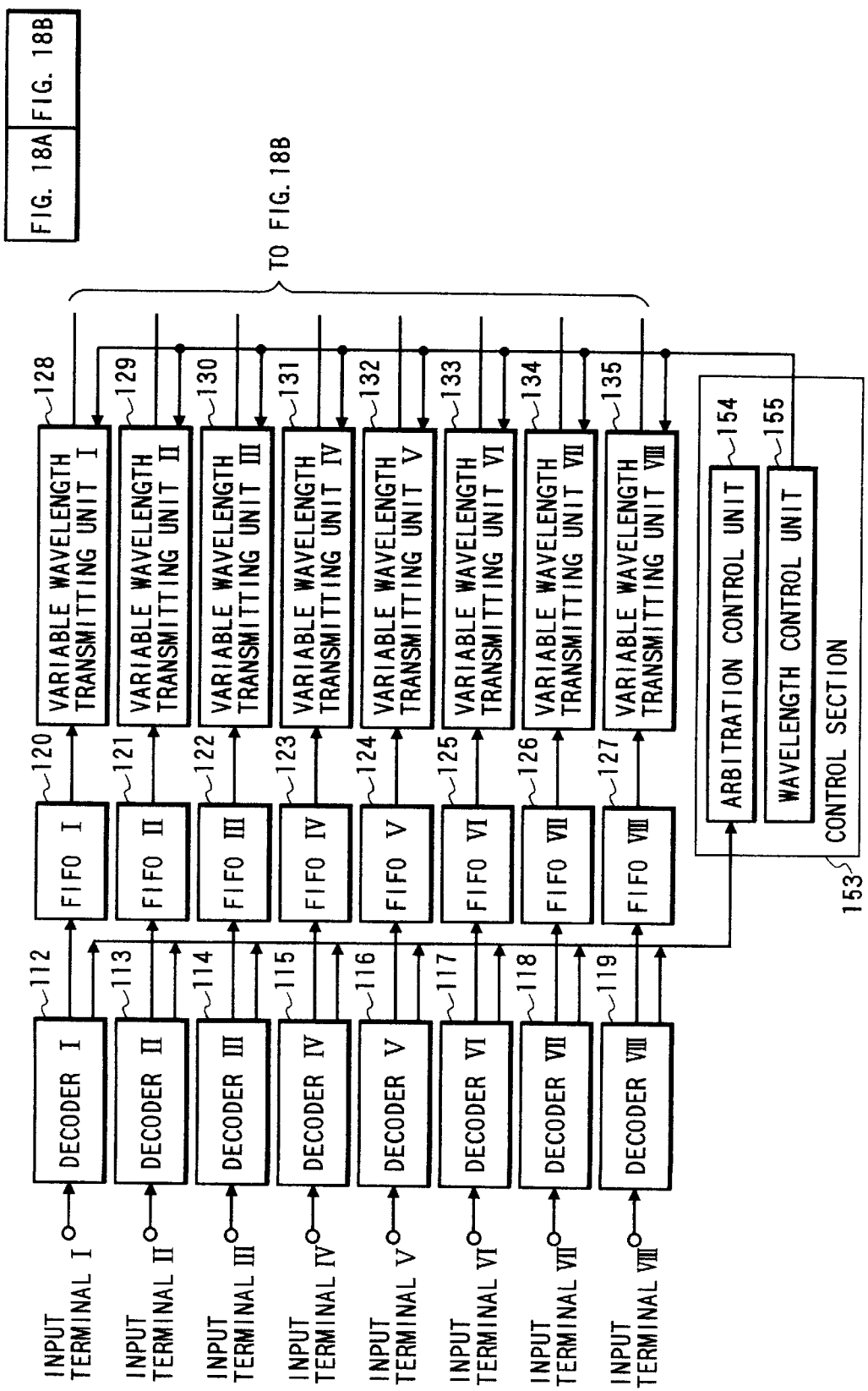

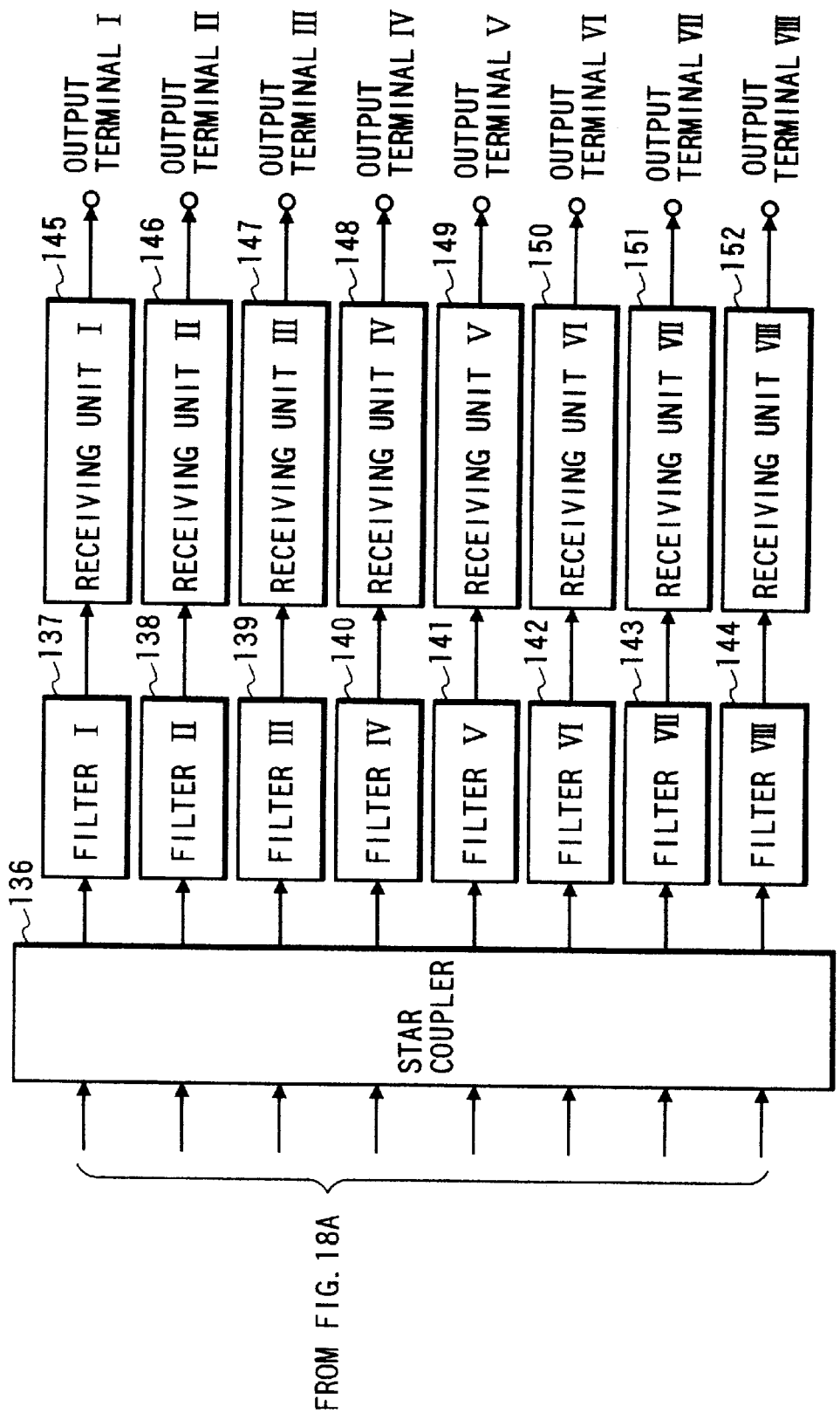

SERVER SYSTEM FOR DELIVERING SIGNAL AND DELIVERY METHOD OF SIGNAL THEREIN

BACKGROUND OF THE INVENTION

1. Field of the Invention

The present invention relates to a server system for storing and reproducing information and a method for delivering information from the server and for storing information in the server. More particularly, the invention concerns the server system and the delivering and storing method for dealing with continuous signals such as video signals. The invention also relates to the server system and the delivering and storing method capable of being simultaneously used at arbitrary timing through plural terminal units.

2. Related Background Art

The following describes the technology for storing or reproducing information, as described in Japanese Laid-open Patent Application No. 3-58348 filed prior to the present application by the applicant of the present invention.

FIG. 13 is a conceptual drawing of the above prior art. Reference numeral 1301 designates a system controller for controlling this information recording and/or reproducing device. Numeral 1302 is a crossbar switch for switching connection between three input/output routes 1304 to 1306 and three optical disks 1307 to 1309 each for storing/reproducing information. Numeral 1303 indicates a management table for the system controller 1301 to refer to for control of crossbar switch 1302 and control of reading/writing with each optical disk, which stores the status of each optical disk.

A continuous signal supplied through the input/output route 1304 is given destination addresses changed in order by the crossbar switch 1302 and is recorded as distributed as partial signals in the respective optical disks 1307 to 1309. Reproduction of the signals recorded in the optical disks is also carried out by reading the partial signals recorded in the respective optical disks. At this time the crossbar switch also switches connection in a predetermined order so as to continuously supply the partial signals outputted from the respective optical disks to one input/output route.

Another conceivable configuration is a server system for delivering signals by use of a switching system for carrying out the ordinary arbitration control. A prior art switching system of this type will be described below.

FIG. 14 shows a crossbar type switching system having N input terminals and N output terminals as a first example of switching system. In FIG. 14 numeral 87 denotes decoders, each of which reads an address part of a packet and informs the control unit of an output terminal to which this packet should be directed. Numeral 88 represents FIFOs (First In First Out), each of which temporarily stores an input packet and outputs it in the input order to an output line according to control from the control unit. Numeral 89 indicates input lines for supplying a packet signal outputted from the FIFO to an input of switch. Numeral 90 denotes switches, each of which serves as a switch of whether or not a packet signal supplied to an input line is to be outputted to an output line. Numeral 91 represents the control unit, which performs the reading control of each FIFO and the control of opening/closing of each switch, according to the output from the decoders. Numeral 92 indicates output lines, each of which supplies a packet signal outputted from the switch, to an output terminal.

In this crossbar type switching system, the control unit performs the routing control for changing the output terminal to be selected for output, by controlling opening/closing of switches connected to a desired output terminal. The control unit also carries out the arbitration control; when the so-called output contention occurs as inputs from plural input terminals simultaneously request outputting to one output terminal, the control unit executes the arbitration control for determining which input out of these plural inputs is to be outputted. The switching operation is achieved based on these controls.

This first example of switching system, however, had a drawback that the scale of hardware became very large, because, in the case of the N input terminals and N output terminals, N×N switches were necessary.

In this first example of switching system, N outputs of switches for connection between plural input lines and output lines are connected to one output line. This results in long wiring of connection lines, which causes occurrence of wiring delay, increase of stray capacitance of wiring, and so on. Increase of the number N of input terminals would make it difficult to increase the operating speed of switch. Therefore, this first example of switching system has a drawback that it is not suitable for quick switching of input packet signal.

In addition, this first example of switching system includes a need for carrying out the arbitration control while detecting occurrence of output contention as to inputs from the all input terminals, for every output terminal. Therefore, it had a drawback that the scale of hardware of the control unit for this control increased.

FIG. 15 shows a second example of switching system for overcoming the drawbacks of the first example of switching system described above. In this example the switching system is configured of switches of 2×2 having two input terminals and two output terminals, described below, connected in multiple stages. In FIG. 15 numeral 93 to numeral 104 represent the switches of 2×2 with two input terminals and two output terminals, which have two functions, straight connection for connecting the input terminals with the output terminals straight and cross connection for connecting the input terminals with the output terminals in a crossing manner. These twelve switches of 2×2 are connected in a shuffle network pattern, thereby realizing an omega switching system with eight input terminals and eight output terminals.

FIG. 16 is a structural diagram to show the inside of the switch of 2×2 with two inputs and two outputs described above. In FIG. 16 numerals 105 and 106 denote decoder I and decoder II, each of which reads an address part of an input packet and informs the control unit of an output terminal to which this packet is to be outputted. Numerals 107 and 108 represent FIFO I (First In First Out) and FIFO II, each of which temporarily stores an input packet and outputs it in the input order to a selector, based on the control from the control unit. Numerals 109 and 110 indicate selector I and selector II, each of which selects an FIFO storing a packet signal to be outputted to an output destination, based on the control from the control unit. The aforementioned straight connection is a state in which the selector I selects the FIFO I while the selector II selects the FIFO II; the aforementioned cross connection is a state in which the selector I selects the FIFO II while the selector II selects the FIFO I.

In this second example of switching system, the number of switches 2×2 necessitated is $N\log N - N/2$ (wherein the base of log is 2), which is smaller than N×N in the first example. The second example, however, necessitates the decoders, FIFOs, control unit, and selectors for each switch of 2×2, and thus had a drawback that the scale of hardware as a whole became large. Furthermore, this second example of switching system had a problem that even in case of connection being not from different input terminals to one output terminal, the so-called blocking phenomenon that connection to a desired output destination was not achieved, occurred depending upon circumstances of connection of the other input terminals. Specifically, for example when the input terminal 5 is connected with the output terminal 3 in FIG. 15, the switch 93 of 2×2 is set in the crossing state, and blocking occurs in connecting the input terminal 1 with the output terminal 1, because the switch 93 of 2×2 has to be set in the straight state.

The switching systems with the electrical switches as shown in the first and second examples of switching system had a drawback that they required use of elements capable of switching at high speed for high-speed operation and such high-speed electric elements were very expensive so as to increase the cost of the total system. Under such circumstances switching systems in the configuration for performing switching after converting a packet signal to an optical signal have been and are studied as quick switching systems of packet signal.

An example of this type is a third example of switching system in which a switching system of 8×8 is constructed by connecting optical switches of 2×2 of an optical waveguide type having the same functions as in the second example of switching system described above, in multiple stages by use of optical fibers. FIGS. 17A and 17B are a schematic diagram and a cross-sectional view of an InP based total reflection type optical switch, which is one of crossing type optical switches being optical switches of 2×2 of the optical waveguide type, used in the third example of switching system. The operation of the InP type total reflection type optical switch is such that carriers are injected into the crossing part where two optical waveguides cross, so as to change the refractive index of a refractive index varying region, whereby an optical signal incident to the crossing part is transmitted or totally reflected to effect switching. This index change by carrier injection is based on the band filling effect that the index change becomes greater as the wavelength of incident light approaches the wavelength of absorption edge of band-to-band transition.

The current injection into the index varying region is effected by the carrier confining effect by a p-InP cladding layer and an n-InP substrate having a large band gap and current constriction by a Zn diffusion region. An InGaAsP cap layer is provided for obtaining good ohmic contact with the electrode. The optical switches are demanded to reduce transmission losses of optical signals and to have large extinction ratios (or to decrease crosstalk). The index change needs to increase for increasing the extinction ratios. The optical switch described above is the one using the band filling effect, and increase of transmission loss and increase of index change occurs as the wavelength of incident light approaches the absorption edge wavelength. Accordingly, setting of the wavelength of incident light is a determining factor for selection between a choice of decreasing the index change at the sacrifice of increase of crosstalk in order to reduce the transmission loss and a choice of increasing the index change to decrease the crosstalk while permitting increase of transmission loss. Setting of wavelength is thus difficult. Especially, when the switches of 2×2 are connected in multiple stages, the number of stages cannot be made large because of this tradeoff between the problem of transmission loss and the crosstalk. There was thus the problem that a large-scale switching system was not available. Since the response speed of switching of switch is limited by the lifetime of injected carriers, there is a problem that switching cannot be made at high speed.

FIGS. 18A and 18B show a fourth example of switching system, which is an example of switching system with eight input terminals and eight output terminals comprised of eight variable wavelength transmitting units of from I to VIII using tunable laser diodes (TLDs) and eight receiving units of from I to VIII using photodiodes (PDs). In FIGS. 18A and 18B numeral 112 to numeral 119 designate decoder I to decoder VIII, each of which reads an address part of an input packet and informs the control unit of an output terminal to which this packet is to be outputted. Numeral 120 to numeral 127 denote FIFO (First In First Out) I to FIFO VIII, each of which temporarily stores an input packet and outputs it in the input order to a variable wavelength transmitting unit, based on the control from the control unit. Numeral 128 to numeral 135 represent variable wavelength transmitting unit I to variable wavelength transmitting unit VIII, each of which converts a packet signal outputted from FIFO I to FIFO VIII to an optical signal of a predetermined wavelength, based on control of a wavelength control unit in the control section, and outputs the optical signal to a star coupler. Numeral 136 is the star coupler, which has a function to combine all beams of wavelengths outputted from the eight variable wavelength transmitting units and outputting the combined beams to eight filters. Numeral 137 to numeral 144 indicate filter I to filter VIII, each of which has a function to transmit only an optical signal of a fixed wavelength but intercept optical signals of the other wavelengths. The transmitting wavelengths of the respective filters are so set that the filter I is at $\lambda 1$, filter II at $\lambda 2$, filter III at $\lambda 3$, filter IV at $\lambda 4$, filter V at $\lambda 5$, filter VI at $\lambda 6$, filter VII at $\lambda 7$, and filter VIII at $\lambda 8$. Numeral 145 to numeral 152 stand for receiving unit I to receiving unit VIII, each of which has a function to convert an optical signal of a predetermined wavelength supplied through the filter I to filter VIII into an electric signal by the photodiode and outputs the electric signal to an output terminal. Numeral 153 denotes the control section for controlling the switching operation of this switching system, which is composed of an arbitration control unit and a wavelength control unit. The arbitration control unit performs control of output contention between input packets entering the respective input terminals for every output terminal to which each input packet should be outputted, based on an instruction supplied from each decoder. The arbitration control unit informs the wavelength control section of the result of this arbitration. The wavelength control unit controls a transmission wavelength of each variable wavelength transmitting unit, based on an instruction from the arbitration control unit. Since in this fourth example of switching system the eight filters I to VIII are so set as to transmit the different wavelengths of optical signals, the wavelengths of optical signals received by the respective receiving units are different from each other and thus independent. Therefore, the routing function for changing the output terminal to which the signal is to be outputted can be realized by changing the transmission wavelength of each variable wavelength transmitting unit.

This fourth example of switching system, however, needed to perform the arbitration control of packets supplied through the all input terminals en bloc, which increased the load in the arbitration control unit and which obstructed increase of speed of switching system.

In addition, the wavelength control unit needs to control the transmission wavelengths to the predetermined wavelengths every packet, according to the instruction from the arbitration control unit. For example, in the case wherein a packet is first sent at the shortest wavelength and the transmission wavelength of a packet to be sent next is the longest wavelength, a change amount of transmission wavelength of variable wavelength transmitting unit thus becomes large.

This requires quick wavelength control, which increases the scale of hardware; or the time necessary for the wavelength change becomes long, which was a drawback to obstruct the increase of speed of switching system.

In the video server system and the video delivery control method using the switching system as described above, the system needed to have the function for packeting the partial video signals to be delivered and the function for reproducing the partial video signals from the packets on the receiving side, which resulted in drawbacks of increasing the hardware scale and increasing the cost.

SUMMARY OF THE INVENTION

In the configuration described in the aforementioned Japanese Laid-open Patent Application No. 3-58348, input/output of signal through the plural input/output routes can be performed simultaneously. An object of the present invention is to further improve the prior art so as to make the control easier upon start of new input/output of signal during a period in which other input/output of signal is on the way. Another object of the present invention is to enable input or output without recognizing access conditions of the other terminals to a memory medium or a memory region to be accessed, upon start of new input/output of signal during the period in which other input/output of signal is on the way. Still another object of the invention is to perform switching of connection between the input/output routes and the memory media more easily by use of new connecting means.

Server systems associated with the present application are as follows.

A server system of the present invention is a server system comprising: a plurality of reproducing means for outputting reproduced signals; a plurality of terminal units for receiving signals outputted from said reproducing means; and altering means for always altering said plurality of reproducing means that said respective terminal units can access, while permitting the respective terminal units to access different said reproducing means simultaneously.

Another server system of the present invention is a server system comprising: a plurality of reproducing means for outputting reproduced signals; altering means for altering channels for permitting the respective reproducing means to output signals according to a predetermined pattern for successively switching the channels for permitting said respective reproducing means to output the signals, said pattern being preliminarily set so that plural reproducing means can output signals to different channels simultaneously; and terminal equipment capable of receiving either one of said channels.

Since the server system is arranged in such a way that the accessible reproducing means are always switched irrespective of presence or absence of input/output of signal and that the respective terminal units can access different reproducing means simultaneously, plural terminal units can simultaneously perform storage or reproduction of signal; and in the case wherein while a certain terminal unit is actually storing or reproducing a signal, another terminal unit starts storing or reproducing a signal, actual input/output of signal can be started without recognizing situations of already started storage or reproduction in order to start the input/output of signal.

This is also the case in the configuration wherein the channels through which the reproducing means can output signals are altered according to the predetermined pattern preliminarily set so that the plurality of reproducing means can output signals to different channels simultaneously. Specifically, since the pattern by which plural reproducing means can output signals to different channels simultaneously is preliminarily set, when a certain channel generates a request for delivery of signal, the reproducing means for outputting a signal to be first read in response to the request can read the signal at the timing when it becomes capable of outputting the signal through the channel. At this time the delivery of signal can be started without consideration on the use condition of the channel and conditions of reading based on the other requests. It should be noted that when delivery of signal is not performed, it is not necessary to effect the alteration into a channel capable of outputting a signal.

Here, the plural reproducing means in the present invention may be, for example, a configuration including plural signal reproducing heads each capable of outputting signals separately, but they may be any means capable of separately outputting stored signals in addition to the foregoing, for example, a plurality of memory regions or a plurality of memory media.

The present invention also provides a server system comprising: a plurality of reproducing means for outputting reproduced signals; variable channel transmitting means provided corresponding to the respective reproducing means, said variable channel transmitting means setting outputs from the respective reproducing means so as to be capable of being outputted in mutually different channels, said variable channel transmitting means successively altering channels capable of outputting; and terminal equipment capable of receiving either one of said mutually different channels. This configuration does not need to use the so-called ordinary switching system, thus presenting the excellent effect that the configuration is simplified. This configuration using the variable channel transmitting means can also be applied to the configurations of the two server systems stated above. One of embodiments of the present invention discloses the configuration wherein variable channel transmitting means are provided corresponding to the respective reproducing means, each terminal unit is arranged to be capable of receiving a predetermined channel, the channels through which the respective variable channel transmitting means can output signals are successively altered by such control that the respective variable channel transmitting means can output signals to different channels simultaneously, and a signal is read out of each storing/reproducing means in synchronization with alteration of channels through which the respective variable channel transmitting means corresponding to the storing/reproducing means can output signals.

In the present invention, the plurality of channels are those that should be discriminated from each other, and they can be light beams discriminated from each other by wavelengths, electromagnetic waves discriminated from each other by modulation frequencies, or signals discriminated from each other by codes. The present invention can utilize a variety of channels as long as they can be used simultaneously.

The altering means may be one having the configuration like a switching system having plural input terminals and plural output terminals. The present invention, however, does not require the arbitration control for identifying an address for every signal and effecting such control as to avoid collision of signal. In one embodiment of the present invention the altering means has input terminals corresponding to the respective reproducing means and output terminals corresponding to the respective output channels, the input terminals to which the respective output terminals are connected are successively altered so that plural input terminals can be connected to different output terminals simultaneously, and outputting of signal from the respective storing/reproducing means is carried out according to the output terminals to which the input terminals corresponding to the respective storing/reproducing means are connected.

The aforementioned pattern may be one used repetitively or a circulating pattern.

The reproducing means may further have means for storing the signal, or may be configured to also serve as means for storing the signal.

Considering reproduction of continuous signal, alteration of the reproducing means that the respective terminal units access or alteration of the reproducing means to which the respective channels are connected can be carried out well so that continuous partial signals can be read out according to the sequence thereof, and the aforementioned predetermined pattern is preferably a pattern according to the order. If partial signals are stored in a certain pattern in memory regions or memory media as in the case where according to the certain pattern, a continuous signal is recorded as being successively divided into partial signals through a certain channel to the plural memory regions or memory media, the continuous signal can be reproduced using the same pattern as the above pattern upon reproduction and, therefore, the order of alteration does not have to be controlled according to the sequence of the continuous signal in particular upon reproduction.

The present invention provides the following as a delivery method of signal in the server system.

The delivery method is a delivery method of signal from reproducing means to terminal equipment in a server system comprising a plurality of reproducing means for outputting reproduced signals and a plurality of terminal units for receiving the signals outputted from said reproducing means, comprising steps of:

always altering said plurality of reproducing means that can access said respective terminal units so as to permit the terminal units to access different reproducing means simultaneously; and performing outputting of signals from said respective reproducing means in accordance with terminal units that the respective reproducing means access.

For delivering a continuous signal by this method, when a first terminal unit out of said plurality of terminal units can access first reproducing means out of said plurality of reproducing means, a first partial signal in a continuous signal is outputted from the first reproducing means and when said reproducing means that said first terminal unit can access is altered to second reproducing means out of said plurality of reproducing means, a second partial signal that is a signal next to said first partial signal is outputted from the second reproducing means.

The present invention also provides the following as another delivery method of signal in the server system.

The delivery method is a delivery method of signal from reproducing means to terminal equipment in a server system comprising a plurality of reproducing means for outputting reproduced signals and terminal equipment for receiving the signals outputted from said reproducing means, comprising steps of:

altering channels for permitting the respective reproducing means to output signals according to a predetermined pattern for successively switching the channels for permitting said respective reproducing means to output the signals, said pattern being preliminarily set so that plural reproducing means can output signals to different channels simultaneously; and performing outputting of signals from said reproducing means in accordance with the channels for permitting the respective reproducing means to output the signals.

For delivering a continuous signal to a terminal unit by this method, in the case where said terminal equipment is set so as to receive a first channel out of said different channels, when first reproducing means out of said plurality of reproducing means can output a signal through said first channel, a first partial signal in a continuous signal is outputted from said first reproducing means; and when second reproducing means out of said plurality of reproducing means becomes capable of outputting a signal through said first channel, a second partial signal that is a signal next to said first partial signal is outputted from said second reproducing means.

The present invention also provides the following as still another delivery method of signal in the server system.

The delivery method is a delivery method of signal from reproducing means to terminal equipment in a server system comprising a plurality of reproducing means for outputting reproduced signals and terminal equipment for receiving the signals outputted from said reproducing means, comprising steps of:

preparing variable channel transmitting means in correspondence to said plurality of respective reproducing means, and successively altering channels for permitting the variable channel transmitting means each to output signals so that outputs from the respective reproducing means can be outputted through mutually different channels; and performing outputting of signals from said respective reproducing means in accordance with channels through which the variable channel transmitting means corresponding to the respective reproducing means can output the signals.

For delivering a continuous signal to a terminal unit by this method, in the case where said terminal equipment is set so as to receive a first channel out of said different channels, when the variable channel transmitting means corresponding to first reproducing means out of said plurality of reproducing means can output a signal through said first channel, a first partial signal in a continuous signal is outputted from said first reproducing means; and when the variable channel transmitting means corresponding to second reproducing means out of said plurality of reproducing means becomes capable of outputting a signal through said first channel, a second partial signal that is a signal next to said first partial signal is outputted from said second reproducing means.

BRIEF DESCRIPTION OF THE DRAWINGS

FIG. 1 which is comprised of FIGS. 1A and 1B is a drawing to show the configuration of the first embodiment according to the present invention;

FIG. 7 is a drawing to show the configuration of a modulation control unit in the second embodiment according to the present invention;

FIG. 8 is a drawing to show the configuration of a terminal unit in the second embodiment according to the present invention;

FIG. 18 which is comprised of FIGS. 18A and 18B is a drawing to show the configuration of the switching system in the fourth conventional example.

DETAILED DESCRIPTION OF THE PREFERRED EMBODIMENTS

Figure 2:
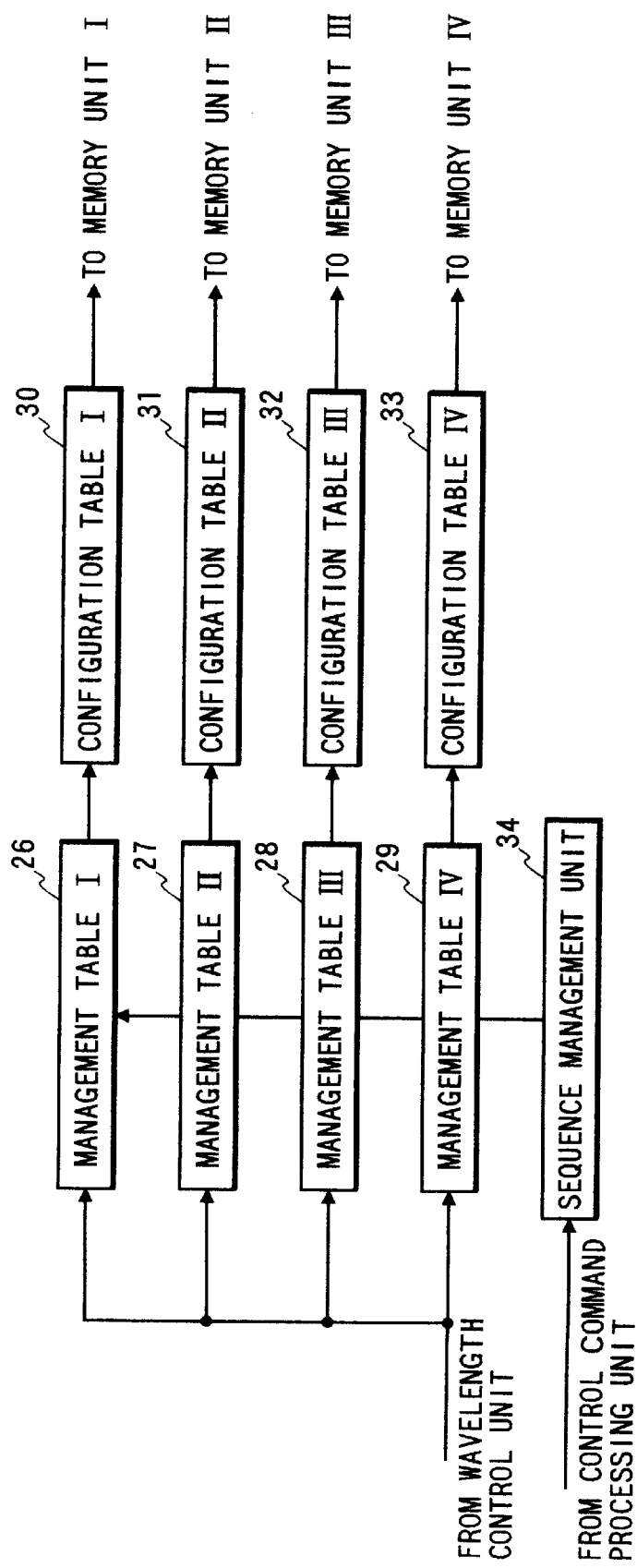
FIG. 2 is a drawing to show the configuration of a memory section controlling unit in the first embodiment according to the present invention.

In the following embodiments, partial signals of a continuous signal are reproduced from a plurality of storing/reproducing devices and are delivered to one terminal unit.

Embodiment 1

FIGS. 1A and 1B illustrate an example of a video server system having four memory units, four variable wavelength transmitting units, and four terminal units, as the first embodiment of the present invention. In this case optical signals of four wavelengths of $\lambda 1$, $\lambda 2$, $\lambda 3$, and $\lambda 4$ outputted from the respective variable wavelength transmitting units function as four transmission channels.

In FIGS. 1A and 1B numeral 1 to numeral 4 are memory unit I to memory unit IV for storing a plurality of video signals, each being comprised of a hard-disk unit permitting random access.

In each memory unit, a plurality of continuous video signals are stored in a divided form of a plurality of continuous partial video signals in the same manner as in the conventional examples. A partial video signal is a video signal of one frame period of video system. Numeral 5 to numeral 8 denote signal processing unit I to signal processing unit IV for converting a partial video signal read out of the memory unit I to the memory unit IV into a desired electrical signal suitable as an input of variable wavelength transmitting unit. Numerals 9 to 12 are variable wavelength transmitting unit I to variable wavelength transmitting unit IV as variable channel transmitting means for converting an electric signal outputted from the signal processing unit I to signal processing unit IV into an optical signal of a desired wavelength among the four transmission wavelengths of $\lambda 1$, $\lambda 2$, $\lambda 3$, and $\lambda 4$ and for sending the optical signal to the next stage. Numeral 13 indicates a star coupler for multiplexing four optical signals transmitted from the aforementioned four variable wavelength transmitting unit I to variable wavelength transmitting unit IV and for supplying the multiplexed signal to the four optical fibers. Numeral 14 to numeral 17 denote optical fiber I to optical fiber IV as transmission paths of optical signal. Numeral 18 to numeral 21 represent terminal units for receiving and reproducing the partial video signal transmitted as an optical signal, each of which has a fixed channel receiving device for receiving only an optical signal of a predetermined wavelength. The internal configuration thereof will be described hereinafter. Numeral 22 designates a control section for controlling the delivery operation of this video server system, which is comprised of a memory section controlling unit, a wavelength control unit, and a control command processing unit. The memory section controlling unit controls reading of partial video signals out of the memory units in synchronization with alteration of transmission wavelengths of the variable wavelength transmitting units according to the control of wavelength control unit. The internal configuration of the memory section controlling unit will be described hereinafter.

The wavelength control unit controls the transmission wavelengths of the variable wavelength transmitting unit I to variable wavelength transmitting unit IV according to a predetermined transmission wavelength control pattern described hereinafter. Numeral 25 denotes the control command processing unit, which processes a command of read request of video signal or the like sent out from the terminal equipment I to terminal equipment IV and supplied through a transmission channel etc. not illustrated and which outputs the result to the memory section controlling unit.

FIG. 2 is a drawing to show the internal configuration of the memory section controlling unit used in the first embodiment of the present invention. In FIG. 2, numerals 26 to 29 are management table I to management table IV, respectively. Each of the management table I to management table IV has four entries corresponding to the terminal equipment I to terminal equipment IV as delivery destinations and each entry stores a continuous video signal to be delivered and a number of partial video signal to be next delivered (which will be referred to as a sequence number). The four entries of the management table I to management table IV are arranged as shown in Table 1 according to the terminal units as delivery destinations and are successively read out by an address value outputted from a 2-bit counter of the wavelength control unit.

Numerals 30 to 33 denote configuration table I to configuration table IV, respectively. Each configuration table stores memory position information about where the individual partial video signals of continuous video signal stored in the respective memory units are stored. Numeral 34 is a sequence management unit, which undergoes management of registration of a continuous video signal to be delivered, initial setting of a sequence number of a partial video signal to be delivered next, into each management table, updating process, and so on.

Figure 3:
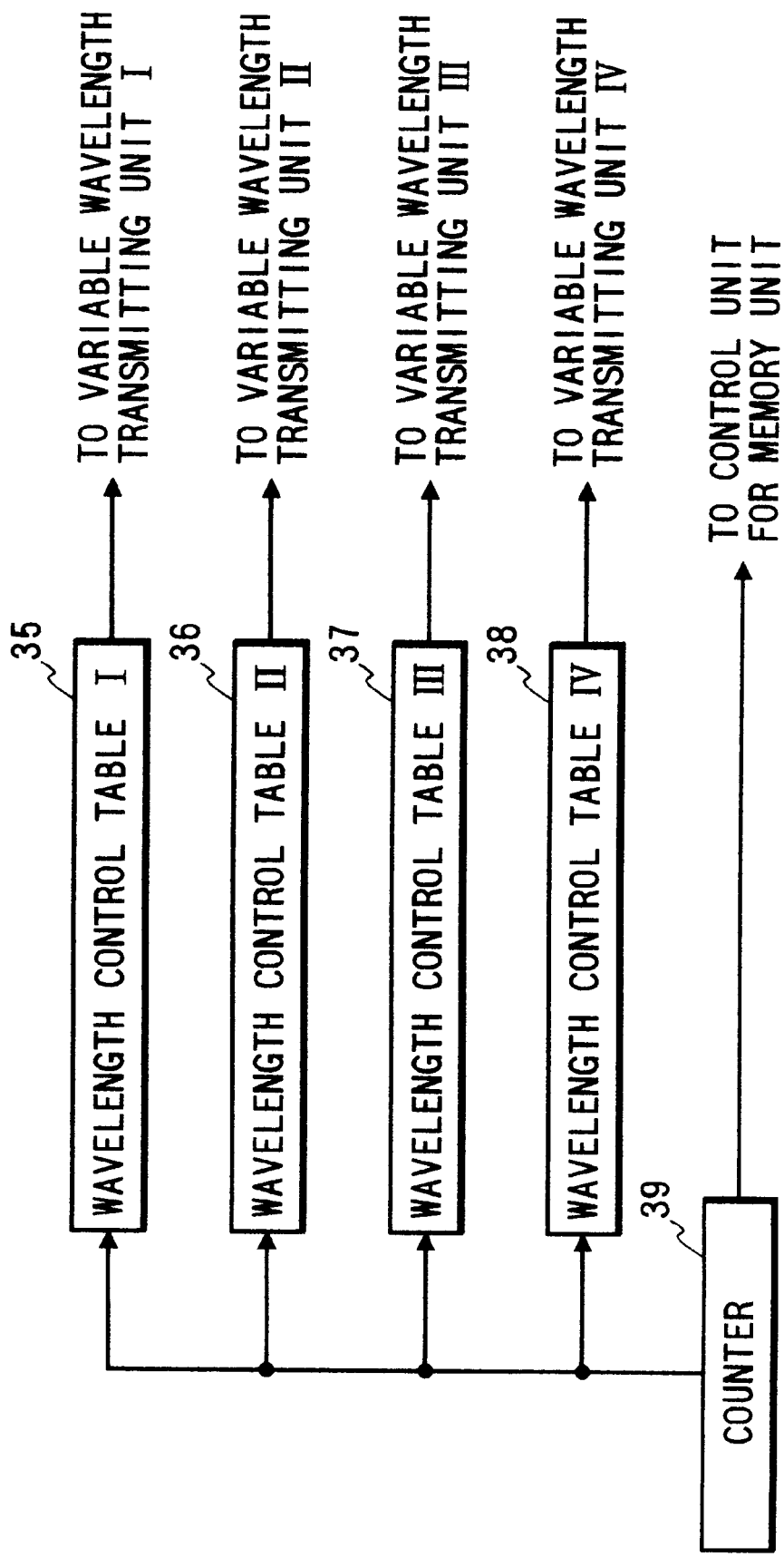
FIG. 3 is a drawing to show the configuration of a wavelength control unit in the first embodiment according to the present invention.

FIG. 3 is a drawing to show the internal configuration of the wavelength control unit used in the first embodiment of the present invention. In FIG. 3, numerals 35 to 38 denote wavelength control table I to wavelength control table IV, respectively. Each of the wavelength control table I to wavelength control table IV is successively read out by an address value outputted from the 2-bit counter 39 to output a predetermined wavelength control signal to a driving section of variable wavelength transmitting unit. These tables are comprised of a read only memory (ROM). The contents of the wavelength control table I to wavelength control table IV will be described hereinafter.

Figure 4:
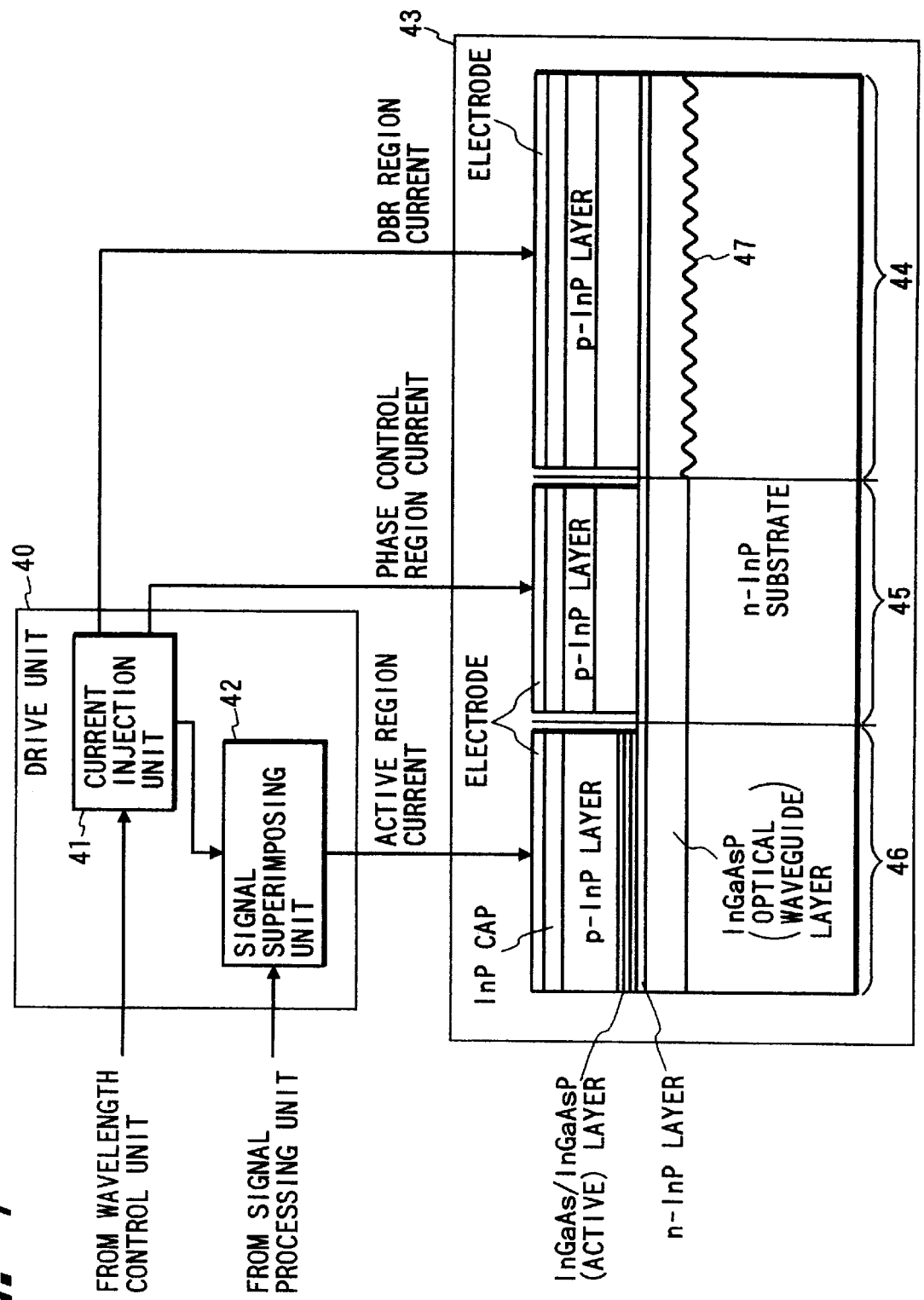
FIG. 4 is a drawing to show the configuration of a variable wavelength transmitting unit in the first embodiment according to the present invention.

FIG. 4 is a drawing to show the internal configuration of the variable wavelength transmitting unit I to variable wavelength transmitting unit IV used in the first embodiment of the present invention. The variable wavelength transmitting unit I to variable wavelength transmitting unit IV all are constructed in the same internal configuration. In FIG. 4, numeral 40 denotes a drive unit, the inside of which is composed of a signal superimposing unit and a current injection unit. Numeral 41 represents the current injection unit, which controls the transmission wavelength from $\lambda 1$ to $\lambda 4$ by controlling bias values of currents injected into three regions, i.e., a radiative region, a phase control region, and a DBR region of tunable laser diode (TLD) of the DBR type, according to a wavelength control signal from the wavelength control unit. Numeral 42 designates the signal superimposing unit, which superimposes an electric signal from the signal processing unit on a bias current from the current injection unit, thereby letting the DBR type tunable laser send an optical signal intensity-modulated at a predetermined wavelength. Numeral 43 is the DBR type tunable laser diode (TLD). Numeral 44 indicates the DBR region, which is a region for altering the refractive index, according to an injected carrier amount, to change the transmission wavelength.

Numeral 45 denotes the phase control region, which is a region for matching the phase of the transmission wavelength in the DBR region with the phase in the radiative region. Numeral 46 denotes the radiative region, which is an active part for lasing. Numeral 47 represents a diffraction grating for unifying the transmission wavelength.

Figure 5:
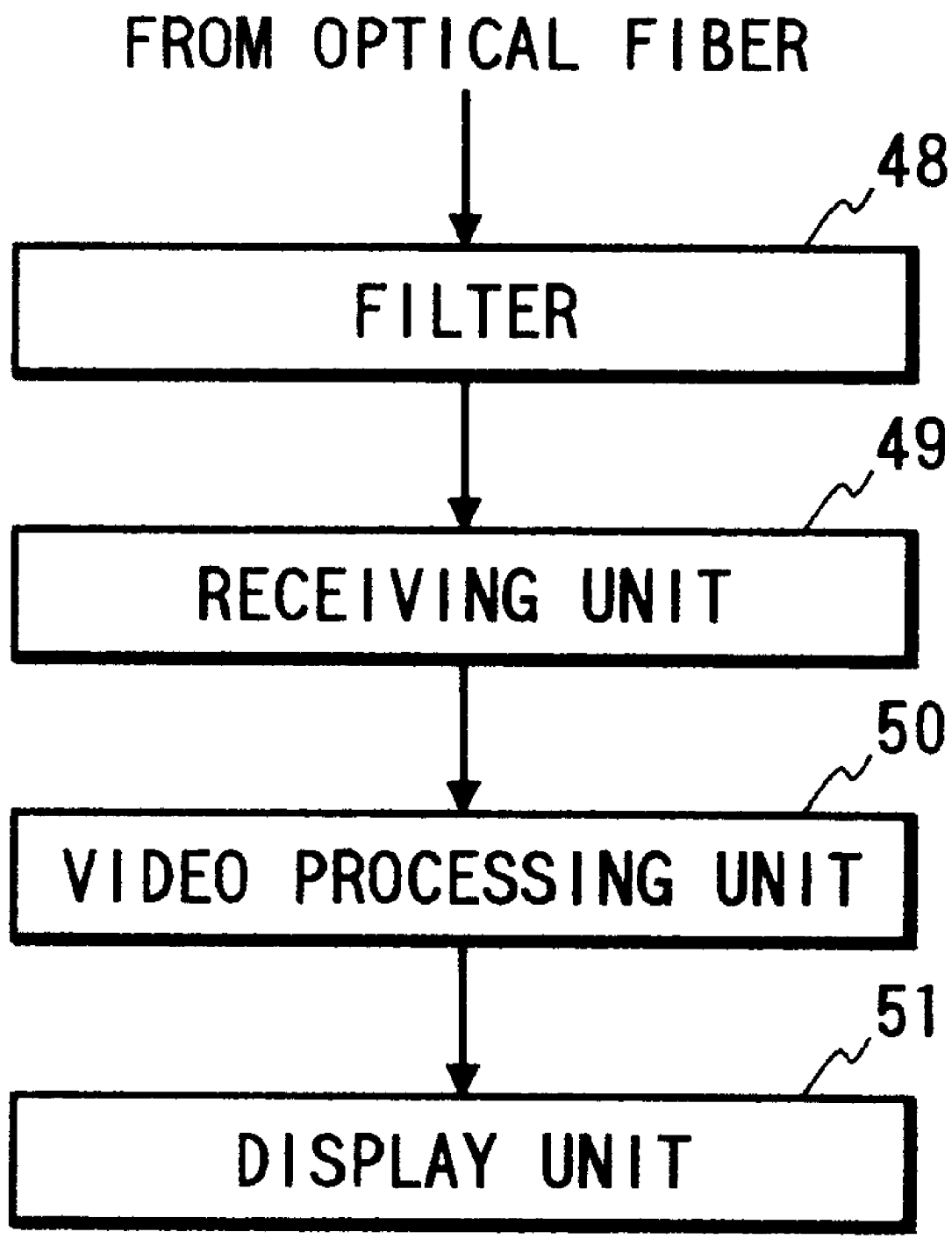
FIG. 5 is a drawing to show the configuration of a terminal unit in the first embodiment according to the present invention.

FIG. 5 is a drawing to show the internal configuration of the terminal equipment I to terminal equipment IV used in the first embodiment of the present invention. The terminal equipment I to terminal equipment IV all is constructed in the same internal configuration except for the transmission wavelengths of filters thereof. In FIG. 5 numeral 48 denotes a filter, which has a function to transmit only an optical signal of a fixed wavelength but intercept optical signals of the other wavelengths in each terminal equipment. The transmission wavelength of filter in each terminal equipment is set to $\lambda 1$ for the filter of terminal equipment I, to $\lambda 2$ for the filter of terminal equipment II, to $\lambda 3$ for the filter of terminal equipment III, or to $\lambda 4$ for the filter of terminal equipment IV. The wavelengths are numbered in order from the smallest. Namely, $\lambda 1 < \lambda 2 < \lambda 3 < \lambda 4$. Numeral 49 designates a receiving unit incorporating a photodiode, which converts an optical signal of a predetermined wavelength transmitted by the filter to an electric signal and outputs the electric signal to a video processing unit. The receiving unit incorporates the pin photodiode (pin-PD) and it has a function to shape the waveform by an amplifier, an equalizer, and a discrimination circuit connected after the pin photodiode and output the thus shaped signal.

The filter and receiving unit of terminal equipment I compose a fixed channel receiving device corresponding to the wavelength $\lambda 1$; the filter and receiving unit of terminal equipment II compose a fixed channel receiving device corresponding to the wavelength $\lambda 2$; the filter and receiving unit of terminal equipment III compose a fixed channel receiving device corresponding to the wavelength $\lambda 3$; and the filter and receiving unit of terminal equipment IV compose a fixed channel receiving device corresponding to the wavelength $\lambda 4$. Numeral 50 denotes a video processing unit, which subjects a video signal outputted from the receiving unit to a necessary process for display in a display unit and which outputs the thus processed signal to the display unit. Numeral 51 is the display unit for displaying the video signal outputted from the video processing unit.

In the first embodiment the contents of wavelength control table I to wavelength control table IV described above are set as shown in Table 2 below.

Table 2 shows wavelengths for transmission of the variable wavelength transmitting units, based on the control of the wavelength control unit. The aforementioned management tables are set as shown in Table 1 and these tables are read out in synchronization by ROM counter. Therefore, the transmission wavelengths of each variable wavelength transmitting unit transition as circulating from $\lambda 1$ in the order of $\lambda 2$, $\lambda 3$, $\lambda 4$, and $\lambda 1$.

As shown in Table 2, the transmission wavelengths of each variable wavelength transmitting unit are determined so that phases of circulation transition of transmission wavelengths are shifted from each other so as to prevent two or more variable wavelength transmitting units from performing transmission at an identical wavelength. In this way the transmission wavelength control pattern is determined by the wavelength control table I to wavelength control table IV.

In Table 1 and Table 2, when the transmission wavelength of variable wavelength transmitting unit is $\lambda 1$, control is made in such a way that a partial video signal for the terminal equipment I is read out of each memory unit; in the same way, when the transmission wavelength is $\lambda 2$, $\lambda 3$, or $\lambda 4$, such control is made that a partial video signal corresponding to a request from the terminal equipment II, terminal equipment III, or terminal equipment IV, respectively, is read out of each memory unit.

The operation of the first embodiment of the present invention will be described referring to FIGS. 1A and 1B, FIG. 2, FIG. 3, FIG. 4, FIG. 5 and the timing chart of Table 3 below with an example in which at time T1 the terminal equipment I requests delivery of continuous video signal A and the terminal equipment IV requests delivery of continuous video signal C at the same time as the request from the terminal equipment I; then at time T2 the terminal equipment II generates a request for delivery of continuous video signal B; further at time T7 the terminal equipment III generates a request for delivery of continuous video signal A which is under delivery to the terminal equipment I.

In the present embodiment, the i-th (i-sequence number) partial video signals of the continuous video signals A, B, and C are recorded as follows.

As regards the continuous video signals A and B:
  the memory unit I stores the partial video signals having sequence numbers satisfying i=4n+1 (where n is zero or natural numbers);

the memory unit II stores the partial video signals having sequence numbers satisfying i=4n+2 (where n is zero or natural numbers);

the memory unit III stores the partial video signals having sequence numbers satisfying i=4n+3 (where n is zero or natural numbers);

the memory unit IV stores the partial video signals having sequence numbers satisfying i=4n (where n is zero or natural numbers);

as regards the continuous video signal C:

the memory unit I stores the partial video signals having sequence numbers satisfying i=4n (where n is zero or natural numbers);

the memory unit II stores the partial video signals having sequence numbers satisfying i=4n+1 (where n is zero or natural numbers);

the memory unit III stores the partial video signals having sequence numbers satisfying i=4n+2 (where n is zero or natural numbers);

the memory unit IV stores the partial video signals having sequence numbers satisfying i=4n+3 (where n is zero or natural numbers).

In the following description, the same reference symbols shown in FIGS. 1A and 1B, FIG. 2 to FIG. 5 will be used for the components having the same internal configurations for convenience' sake.

TABLE 1

| Address (entry) | 0 | 1 | 2 | 3 |
|---|---|---|---|---|
| Management table I | I | II | III | IV |
| Management table II | IV | I | II | III |
| Management table III | III | IV | I | II |
| Management table IV | II | III | IV | I |

TABLE 2

| Address (entry) | 0 | 1 | 2 | 3 |
|---|---|---|---|---|
| Wavelength control table I | λ1 | λ2 | λ3 | λ4 |
| Wavelength control table II | λ4 | λ1 | λ2 | λ3 |
| Wavelength control table III | λ3 | λ4 | λ1 | λ2 |
| Wavelength control table IV | λ2 | λ3 | λ4 | λ1 |

TABLE 3

| Time | T1 | T2 | T3 | T4 | T5 | T6 | T7 | T8 |
|---|---|---|---|---|---|---|---|---|
| Counter output | 0 | 1 | 2 | 3 | 0 | 1 | 2 | 3 |
| Management table I | I | II | III | IV | I | II | III | IV |
| Management table II | IV | I | II | III | IV | I | II | III |
| Management table III | III | IV | I | II | III | IV | I | II |
| Management table IV | II | III | IV | I | II | III | IV | I |
| Memory unit I | a1 | b1 | — | c4 | a5 | b5 | a1 | c8 |
| Memory unit II | c1 | a2 | b2 | — | c5 | a6 | b6 | a2 |
| Memory unit III | — | c2 | a3 | b3 | — | c6 | a7 | b7 |
| Memory unit IV | — | — | c3 | a4 | b4 | — | c7 | a8 |
| Variable wavelength transmitting unit I | λ1 | λ2 | λ3 | λ4 | λ1 | λ2 | λ3 | λ4 |
| Variable wavelength transmitting unit II | λ4 | λ1 | λ2 | λ3 | λ4 | λ1 | λ2 | λ3 |
| Variable wavelength transmitting unit III | λ3 | λ4 | λ1 | λ2 | λ3 | λ4 | λ1 | λ2 |
| Variable wavelength transmitting unit IV | λ2 | λ3 | λ4 | λ1 | λ2 | λ3 | λ4 | λ1 |
| Terminal equipment I | a1 | a2 | a3 | a4 | a5 | a6 | a7 | a8 |
| Terminal equipment II | — | b1 | b2 | b3 | b4 | b5 | b6 | b7 |
| Terminai equipment III | — | — | — | — | — | — | a1 | a2 |
| Terminal equipment IV | c1 | c2 | c3 | c4 | c5 | c6 | c7 | c8 |

When the terminal equipment I generates a request for reproduction of continuous video signal A at the time T0 prior to the time T1, the control command processing unit analyzes this request for reproduction and instructs the sequence management unit to set the management table I to management table IV. Receiving this instruction, the sequence management unit registers the continuous video signal A as a continuous video signal to be reproduced in the entry corresponding to the terminal equipment I in the management table I and, at the same time as it, performs initial setting of the sequence number to 1. Also, the continuous video signal A is registered as a continuous video signal to be reproduced in the entry corresponding to the terminal equipment I in the management table II and, at the same time as it, the sequence number is initially set to 2. Further, the continuous video signal A is also registered as a continuous video signal to be reproduced in the entry corresponding to the terminal equipment I in the management table III and the sequence number is initially set to 3. Similarly, the continuous video signal A is also registered as a continuous video signal to be reproduced in the entry corresponding to the terminal equipment I in the management table IV and the sequence number is initially set to 4.

In the same manner, in response to a request for reproduction of the continuous video signal C from the terminal equipment IV at the time T0, the sequence management unit registers the continuous video signal C as a continuous video signal in the entries of terminal equipment IV in the management table I to management table IV and further sets the sequence number of the entry corresponding to the terminal equipment IV in the management table II to 1 and the sequence numbers of the entries corresponding to the terminal equipment IV in the management table III, management table IV, and management table I to 2, 3, and 4, respectively.

According to these settings, at the time T1 the counter of the wavelength control unit outputs 0 as a read address value simultaneously to the wavelength control tables I to IV. The contents of the wavelength control tables are read out by this address value. The contents read out at this time are as shown in Table 2 described before; the control signal corresponding to the wavelength λ1 is read out of the wavelength control table I; and the control signals corresponding to the wavelength λ4, wavelength λ3, and wavelength λ2 are read out of the wavelength control table II, wavelength control table III, and wavelength control table IV, respectively. These control signals are supplied to the associated drive units of the respective variable wavelength transmitting unit I to variable wavelength transmitting unit IV. In the drive units injection currents of the current injection units are set by these wavelength control signals and the transmission wavelength of each tunable laser diode (TLD) is set to be the predetermined wavelength.

At the same time as it, the read address value 0 outputted from the counter of the wavelength control unit is supplied to the management tables of the memory section controlling unit at the operating time T1. The contents of the management tables I to IV are read out by this address value.

The contents read out at this time are as shown in Table I described previously; the continuous video signal and sequence number corresponding to the terminal equipment I are read out of the management table I; and the continuous video signal and sequence number corresponding to the terminal equipment IV, the terminal equipment III, or the terminal equipment II are read out of the management table II, the management table III, or the management table IV, respectively. It is noted here that the continuous video signals and sequence numbers corresponding to the terminal equipment III and terminal equipment II are not registered at this point of time. The continuous video signal name A and sequence number 1 corresponding to the terminal equipment I, read out of the management table I, are supplied to the configuration table I and information is obtained concerning the position of location in the memory unit I, whereby the partial video signal a1 is reproduced from the memory unit I to be outputted to the signal processing unit I. The partial video signal a1 supplied to the signal processing unit I is converted to an output signal to the variable wavelength transmitting unit I and the output signal is outputted to the variable wavelength transmitting unit I. Since the variable wavelength transmitting unit I receives the control signal for setting the transmission wavelength to $\lambda 1$ from the wavelength control table of the wavelength control unit, the partial video signal a1 is outputted in the form of an optical signal of the wavelength $\lambda 1$ to the star coupler. The partial video signal a1 of the wavelength $\lambda 1$ outputted to the star coupler is then outputted to the optical fiber I to optical fiber IV. Since the filters of the terminal equipment I to terminal equipment IV are set so as to transmit only $\lambda 1$, $\lambda 2$, $\lambda 3$, and $\lambda 4$, respectively, as described above, the partial video signal a1 sent out in the form of the optical signal of the wavelength $\lambda 1$ is transmitted by only the filter of terminal equipment I to be received by only the receiving unit of terminal equipment I and then is converted to a desired video signal in the video processing unit to be displayed in the display unit.

Similarly, the continuous video signal name C and sequence number 1 corresponding to the terminal equipment IV, read out of the management table II, are supplied to the configuration table II and information is obtained concerning the position of location in the memory unit II, whereby the partial video signal c1 is reproduced from the memory unit II. Then the partial video signal c1 is converted to an output signal to the variable wavelength transmitting unit II by the signal processing unit II and the output signal is outputted to the variable wavelength transmitting unit II. Since the variable wavelength transmitting unit II receives the control signal for setting the transmission wavelength to $\lambda 4$ from the wavelength control table of the wavelength control unit, the partial video signal c1 is outputted in the form of an optical signal of the wavelength $\lambda 4$ to the star coupler and it is further outputted to the optical fiber I to optical fiber IV. Since only the filter of terminal equipment IV transmits the optical signal of the wavelength $\lambda 4$ as described above, the partial video signal c1 sent out in the form of the optical signal of wavelength $\lambda 4$ is received by only the receiving unit of terminal equipment IV and then is converted to a desired video signal by the video processing unit to be displayed in the display unit.

Before the end of time T1 the sequence management unit performs the updating process to add 4 to the values in the sequence number column corresponding to the terminal equipment I of management table I and in the sequence number column corresponding to the terminal equipment IV of management table II from which the sequence numbers were read out.

At the time T1, similarly, in response to a request for reproduction of the continuous video signal B from the terminal equipment II, the sequence management unit registers the continuous video signal B as a continuous video signal in the entries of terminal equipment II in the management table I to management table IV and further sets the sequence number of the entry corresponding to the terminal equipment II in the management table I to 1 and the sequence numbers of the entries corresponding to the terminal equipment II in the management table II, management table III, and management table IV to 2, 3, and 4, respectively.

At the time T2 the control signals for setting the transmission wavelengths to $\lambda 2$, $\lambda 1$, $\lambda 4$, and $\lambda 3$ are outputted from the wavelength control table I to wavelength control table IV of the wavelength control unit to the variable wavelength transmitting unit I to variable wavelength transmitting unit IV, respectively.

On the other hand, the continuous video signal names and sequence numbers to be delivered to the terminal equipment II, terminal equipment I, terminal equipment IV, and terminal equipment III are read out of the management table I to management table IV, respectively, of the memory section controlling unit to be outputted to the configuration tables. Information of location of desired partial video signals is outputted from the configuration tables. This causes the partial video signals b1, a2, c2 to be read out of the memory unit I to memory unit III, respectively. At this time there is no partial video signal read out of the memory unit IV. Each partial video signal b1, a2, c2 is converted to an optical signal of $\lambda 2$, $\lambda 1$, or $\lambda 4$, respectively, in the variable wavelength transmitting unit I, the variable wavelength transmitting unit II, or the variable wavelength transmitting unit III and the optical signal is outputted through the star coupler and optical fiber to each terminal equipment. The partial video signal a2 transmitted in the form of the optical signal of the wavelength $\lambda 1$ is received and displayed by the terminal equipment I. On the other hand, the partial video signal b1 and partial video signal c2 transmitted at the respective wavelengths $\lambda 2$ and $\lambda 4$ are received and displayed by the terminal equipment II and by the terminal equipment IV, respectively.

In the same manner as at the time T1, before the end of the time T2 the sequence management unit performs the updating process to add 4 to the values in the sequence number column corresponding to the terminal equipment II of management table I, in the sequence number column corresponding to the terminal equipment I of management table II, and in the sequence number column corresponding to the terminal equipment IV of management table III from which the sequence numbers were read out.

At the next time T3, the continuous video signal names and sequence numbers to be delivered to the terminal equipment II, terminal equipment I, and terminal equipment IV are read out of the management table II, management table III, and management table IV, respectively; the partial video signal b2, a3, or c3 is read out of the memory unit II, memory unit III, or memory unit IV; each partial video signal is converted to an optical signal of the wavelength $\lambda 2$, $\lambda 1$, or $\lambda 4$, respectively, in the variable wavelength transmitting unit II, variable wavelength transmitting unit III, or variable wavelength transmitting unit IV; and each optical signal is transmitted to the corresponding terminal equipment. After that, the partial video signal a3 transmitted at the wavelength $\lambda 1$ is received and displayed by the terminal equipment I. The partial video signal b2 transmitted at the wavelength $\lambda 2$ is received and displayed by the terminal equipment IV and the partial video signal c3 transmitted at the wavelength $\lambda 4$ is received and displayed by the terminal equipment IV.

Delivery processes at times T4, T5, and T6 will be carried out thereafter in the same manner.

When at the time T6 the terminal equipment III generates a request for delivery of the continuous video signal A being under delivery, the sequence management unit registers the continuous video signal A as a continuous video signal in the entries of terminal equipment III in the management table I to management table IV and further sets the sequence number of the entry corresponding to the terminal equipment III in the management table I to 1 and the sequence numbers of the entries corresponding to the terminal equipment II in the management table II, management table III, and management table IV to 2, 3, and 4, respectively.

According to this setting, at the time T7 the partial video signal a1 to be delivered to the terminal equipment III is read out of the memory unit I; it is converted to an optical signal of the wavelength $\lambda 3$ in the variable wavelength transmitting unit I; the optical signal is transmitted to the terminal equipment III; thereafter the partial video signal a1 is received and displayed by the terminal equipment III. At this time, for the terminal equipment I having already being receiving delivery of continuous video signal A, the partial video signal a7 is read out of the memory section III and is transmitted in the form of an optical signal of the wavelength $\lambda 1$ from the variable wavelength transmitting unit III. The optical signal is received by only the terminal equipment I. Although the terminal equipment I and the terminal equipment III requests delivery of the same continuous video signal as described, the delivery can be carried out simultaneously to the terminal equipment I and to the terminal equipment III, because the memory units of the partial video signals to be delivered are different and the wavelengths of the optical signals used upon the delivery are also different.

In the present embodiment each memory unit may also be used as divided as shown in the prior art described in relation to Japanese Laid-open Patent Application No. 3-58348. In this case, quick access can be realized, if a certain signal and a signal to be next read after the signal (for example, the partial video signals of i=5 and i=9 out of the partial video signals composing the continuous video signal A stored in the memory unit I described above) are set to be stored in proximate regions in each memory unit.

Embodiment 2

Figure 6:
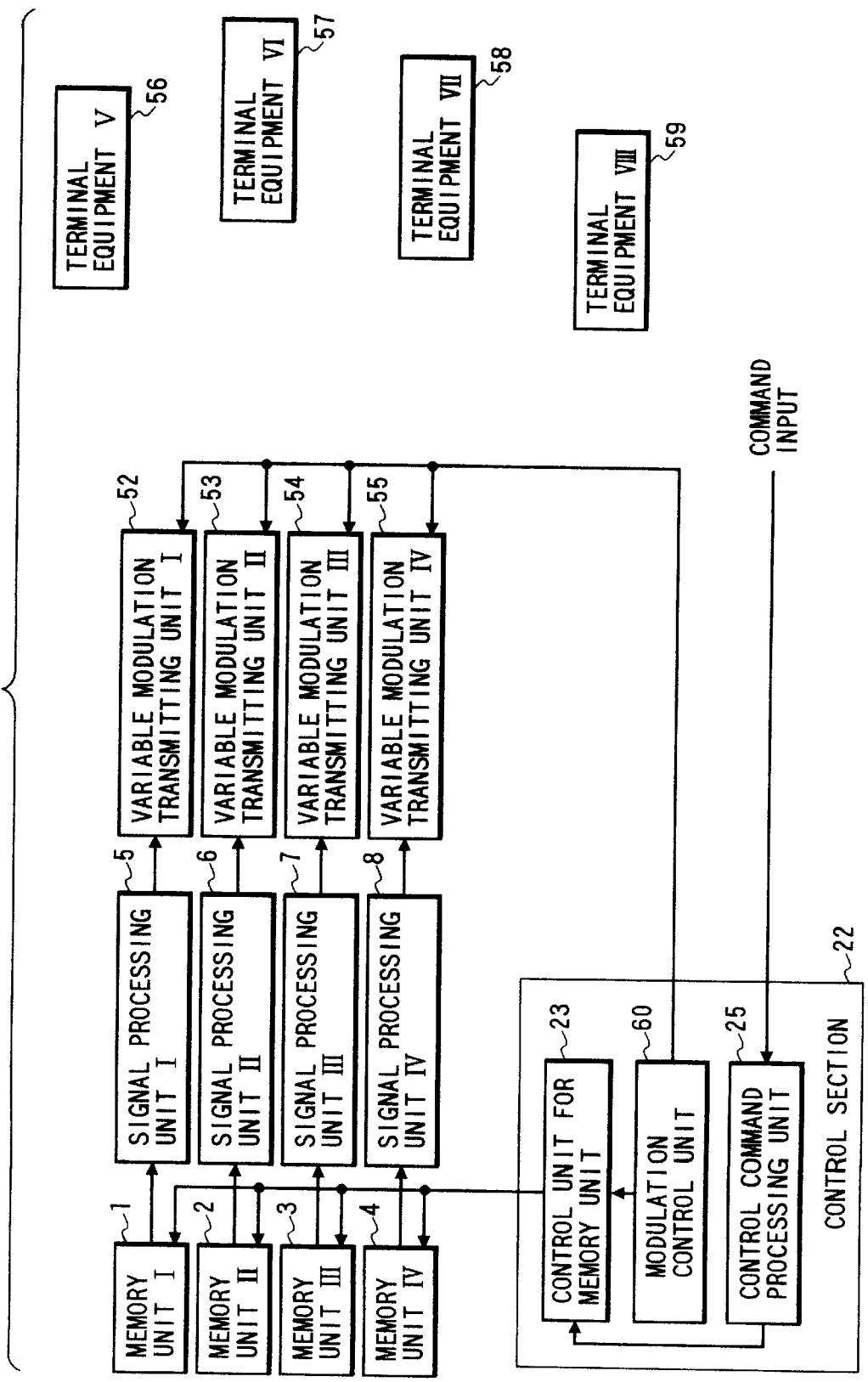
FIG. 6 is a drawing to show the configuration of the second embodiment according to the present invention.

FIG. 6 shows the configuration using radio waves as transmission channels, which is the second embodiment of the present invention.

In FIG. 6 the same reference symbols denote the same blocks as in the first embodiment.

In FIG. 6, numerals 52 to 55 designate variable modulation transmitting units, each of which modulates a partial video signal outputted from the signal processing unit at a predetermined modulation frequency out of frequencies f1, f2, f3, and f4 by control from a modulation control unit and then transmits the modulated signal to terminal equipment. Numeral 60 denotes the modulation control unit, which is comprised of modulation control tables and a counter as shown in FIG. 7, similar to those in Embodiment 1. The modulation control tables are for designating a modulation frequency upon transmission of a variable modulation transmitting unit and the contents thereof are similar to those of the wavelength control tables in aforementioned Embodiment 1 as shown in Table 4 below.

TABLE 4

| Address (entry) | 0 | 1 | 2 | 3 |
|---|---|---|---|---|
| Modulation control table I | f1 | f2 | f3 | f4 |
| Modulation control table II | f4 | f1 | f2 | f3 |
| Modulation control table III | f3 | f4 | f1 | f2 |
| Modulation control table IV | f2 | f3 | f4 | f1 |

In FIG. 8 numeral 65 represents a tuning unit for extracting only a signal transmitted at a predetermined modulation frequency out of the partial video signals transmitted from the variable modulation transmitting units. The frequencies f1, f2, f3, and f4 are assigned to the terminal equipment V, terminal equipment VI, terminal equipment VII, and terminal equipment VIII, respectively. In this second embodiment, a partial video signal to each terminal equipment read out of the memory unit I, memory unit II, memory unit III, or memory unit IV is modulated and transmitted at a frequency matching a tuning frequency of terminal equipment as a delivery destination in the variable modulation transmitting unit, based on setting of modulation control table in the modulation control unit. This configuration has such a feature that construction of system becomes easier, because it does not necessitate installation of optical-fibers etc.

Embodiment 3

Figure 9B:
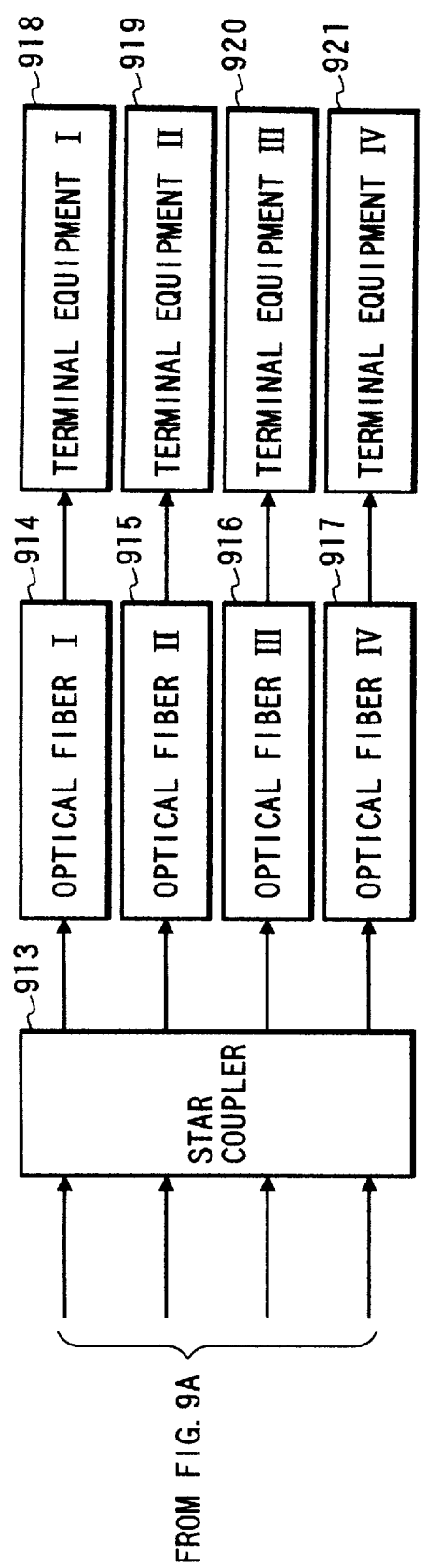
FIG. 9 which is comprised of FIGS. 9A and 9B is a drawing to show the configuration of the third embodiment according to the present invention.

FIGS. 9A and 9B show an example of the video server system having four memory units, four fixed wavelength transmitting units, a connection alteration unit, and four terminal units, which is the third embodiment of the present invention. In this example the optical signals of the four wavelengths of $\lambda 1$, $\lambda 2$, $\lambda 3$, and $\lambda 4$ outputted from the respective fixed wavelength transmitting units function as four transmission channels.

In FIGS. 9A and 9B numeral 901 to numeral 904 are memory unit I to memory unit IV for storing a plurality of video signals, each of which is composed of a hard-disk device permitting random access.

A plurality of continuous video signals are divided each into a plurality of continuous partial video signals and the partial video signals are stored in the respective memory units, as in the conventional example described in relation to Japanese Laid-open Patent Application No. 3-58348. A partial video signal is a video signal of one frame period of video system. Numeral 905 to numeral 908 denote signal processing unit I to signal processing unit IV for converting a partial video signal read out of the memory unit I to memory unit IV to a desired electric signal suitable as an input to the fixed wavelength transmitting unit. Numeral 900 is the connection alteration unit for altering the relation of connection between the signal processing units I to IV and the fixed wavelength transmitting units I to IV. Numerals 909 to 912 indicate the fixed wavelength transmitting unit I to fixed wavelength transmitting unit IV as fixed channel transmitting means for converting an electric signal outputted from the signal processing unit I to signal processing unit IV to an optical signal of either one predetermined wavelength out of $\lambda 1$, $\lambda 2$, $\lambda 3$, and $\lambda 4$. The transmission wavelength of the fixed wavelength transmitting unit I is $\lambda 1$, the transmission wavelength of the fixed wavelength transmitting unit II is $\lambda 2$, the transmission wavelength of the fixed wavelength transmitting unit III is $\lambda 3$, and the transmission wavelength of the fixed wavelength transmitting unit IV is $\lambda 4$. Numeral 913 is the star coupler for multiplexing four optical signals sent from the aforementioned four fixed wavelength transmitting unit I to fixed wavelength transmitting unit IV and for outputting the multiplexed signal into the four optical fibers. Numeral 914 to numeral 917 are optical fiber I to optical fiber IV as transmission paths of optical signal. Numeral 918 to numeral 921 denote the terminal units for receiving and reproducing the partial video signal transmitted as an optical signal, each of which has a fixed channel receiving device for receiving only an optical signal of a predetermined wavelength. The internal structure thereof will be described hereinafter. Numeral 922 designates a control section for performing control of the delivery operation of this video server system, which is composed of memory section controlling unit 923, connection alteration control unit 924, and control command processing unit 925. The memory section controlling unit controls reading of partial video signal out of the memory unit in synchronization with alteration of connection relation between the signal processing units I to IV and the fixed wavelength transmitting units I to IV by control of the connection alteration control unit. The internal configuration thereof will be described hereinafter.

The connection alteration control unit 924 controls the relation of connection between the signal processing units I to IV and the fixed wavelength transmitting unit I to fixed wavelength transmitting unit IV in accordance with a predetermined connection control pattern described hereinafter. Numeral 925 is the control command processing unit, which processes a command input such as a request for reading of video signal, sent from the terminal equipment I to terminal equipment IV through a transmission channel etc. not illustrated, and which outputs the result to the memory section controlling unit.

Figure 10:
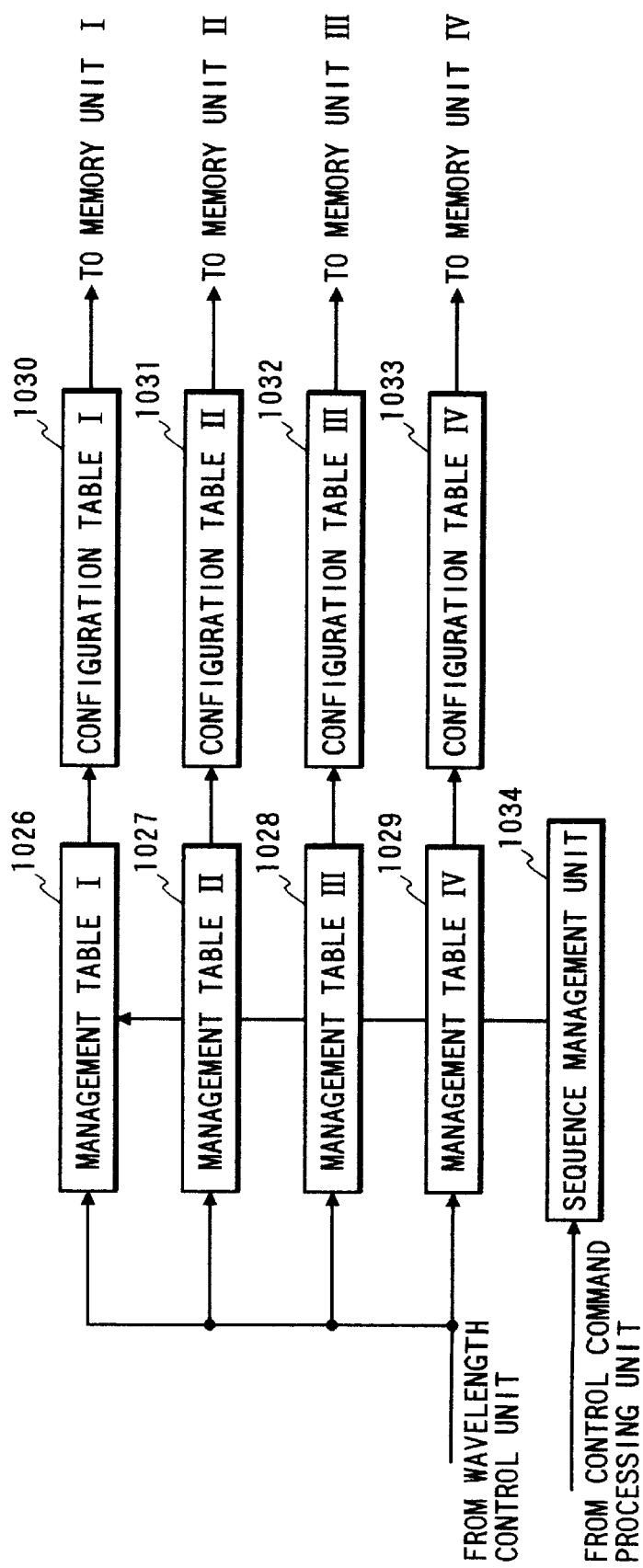
FIG. 10 is a drawing to show the configuration of a memory control unit in the third embodiment according to the present invention.

FIG. 10 is a drawing to show the internal configuration of the memory section controlling unit 923 used in the third embodiment of the present invention. In FIG. 10 numerals 1026 to 1029 represent management table I to management table IV, respectively. Each of the management table I to management table IV has four entries corresponding to the terminal equipment I to terminal equipment IV as delivery destinations and each entry stores a continuous video signal to be delivered and a number (hereinafter referred to as a sequence number) of a partial video signal to be next delivered. The four entries of the management table I to management table IV are arranged as shown in Table 5 in accordance with the terminal units as delivery destinations and are successively read out by an address value outputted from the 2-bit counter of the connection control unit.

Numerals 1030 to 1033 stand for configuration table I to configuration table IV, respectively. Each configuration table stores information of memory position about where the individual partial video signals of continuous video signals stored in the respective memory units are stored. Numeral 1034 is the sequence management unit, which performs management of registration of a continuous video signal to be delivered, initial setting of a sequence number of a partial video signal to be next delivered, into each management table, updating process, and so on.

Figure 11:
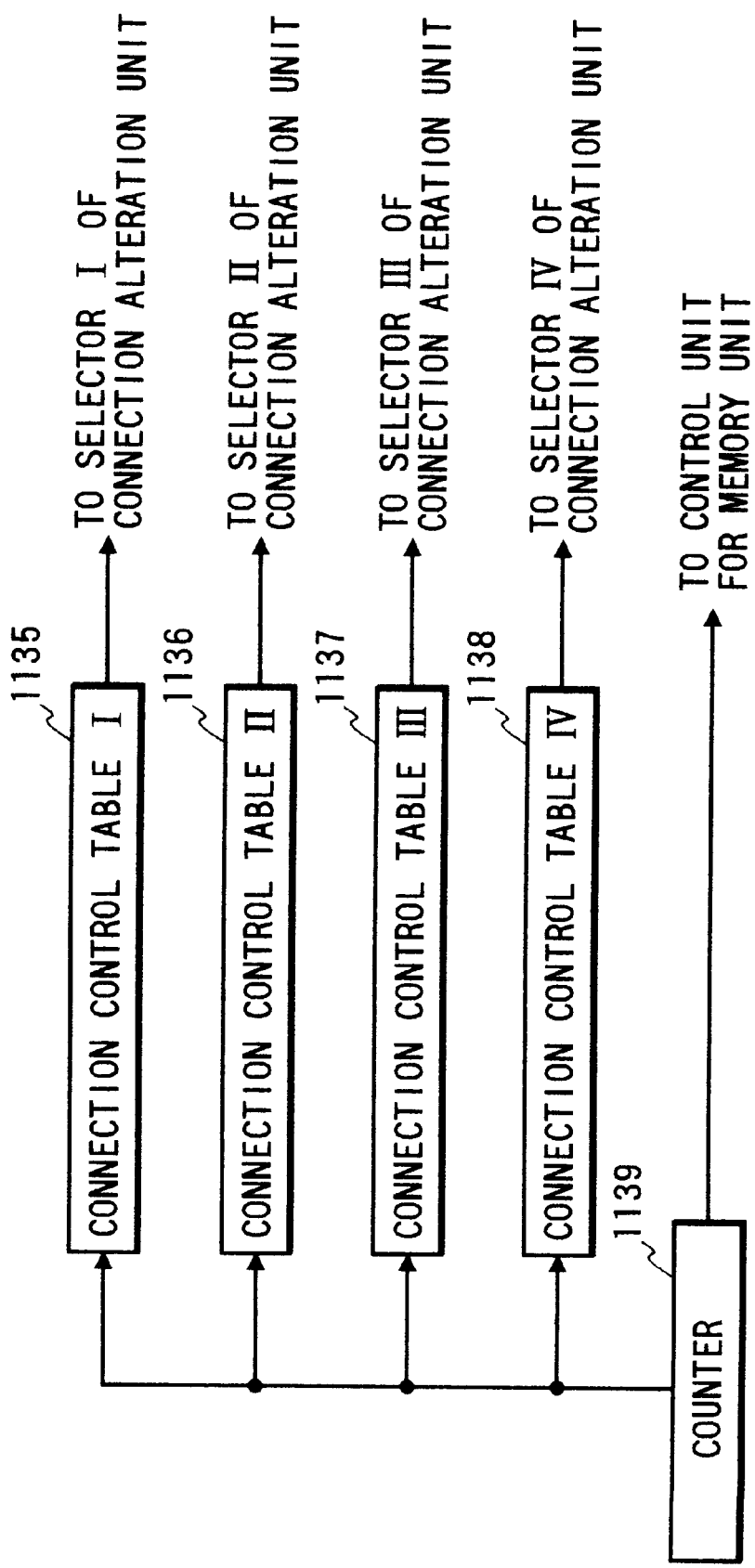
FIG. 11 is a drawing to show the configuration of a connection control unit in the third embodiment according to the present invention.

FIG. 11 is a drawing to show the internal configuration of the connection control unit used in the third embodiment of the present invention. In FIG. 11 numerals 1135 to 1138 are connection control table I to connection control table IV, respectively. The connection control table I to connection control table IV are successively read by the address value outputted from the 2-bit counter 1139 to output predetermined select signals to selectors of the connection alteration unit. These tables are constructed of a read only memory (ROM). The contents of the connection control table I to connection control table IV will be described hereinafter.

Figure 12:
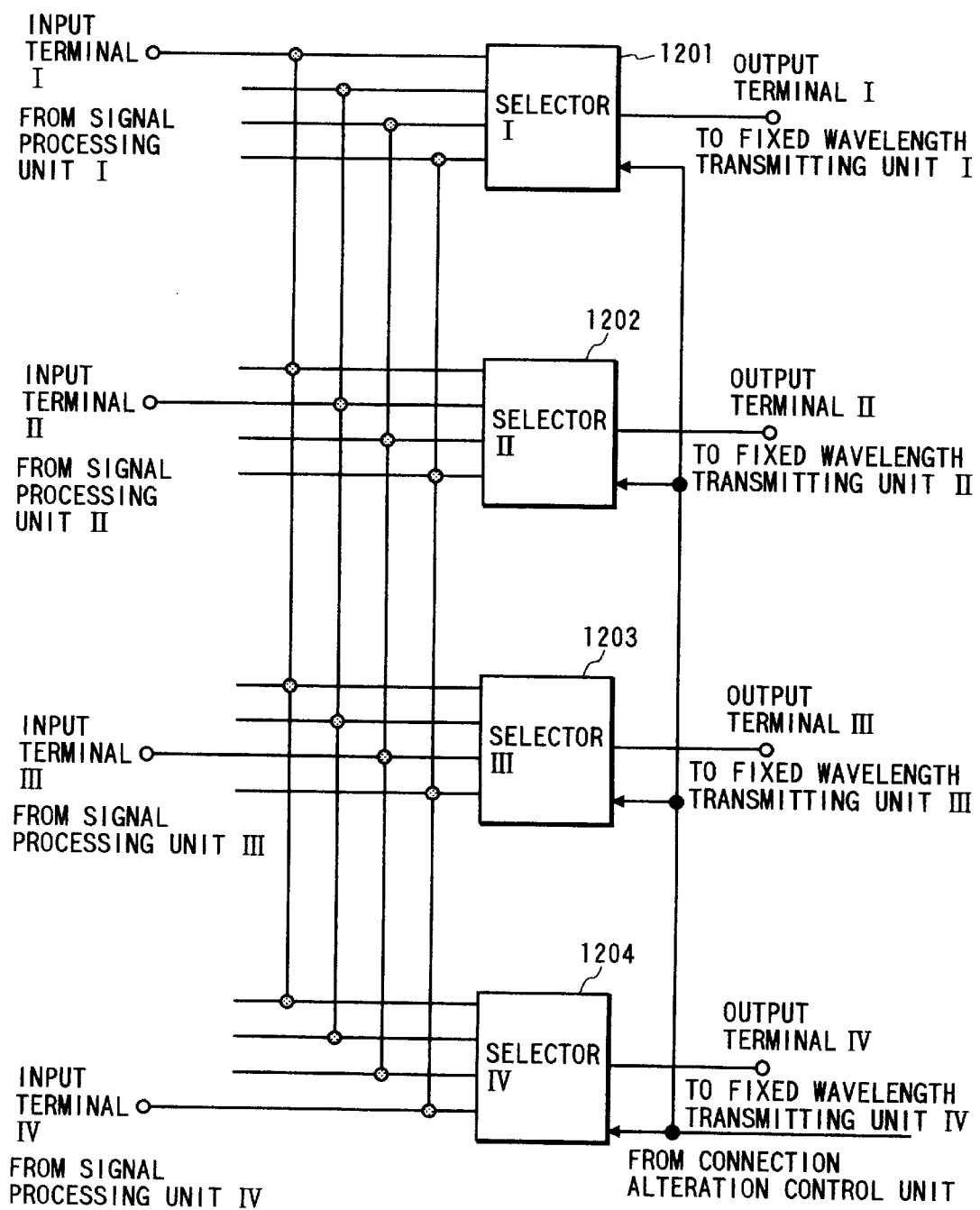
FIG. 12 is a drawing to show the configuration of a connection alteration unit in the third embodiment according to the present invention.
Figure 13:
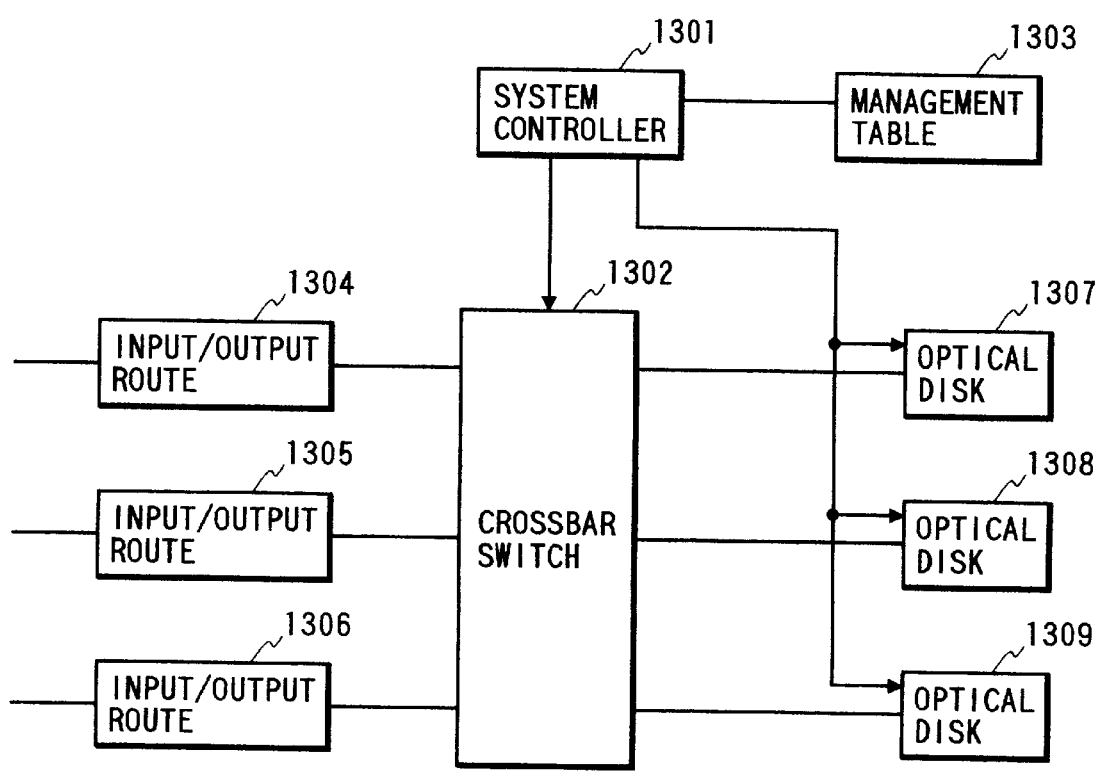
FIG. 13 is a drawing to show the configuration of the video server in a conventional example.
Figure 14:
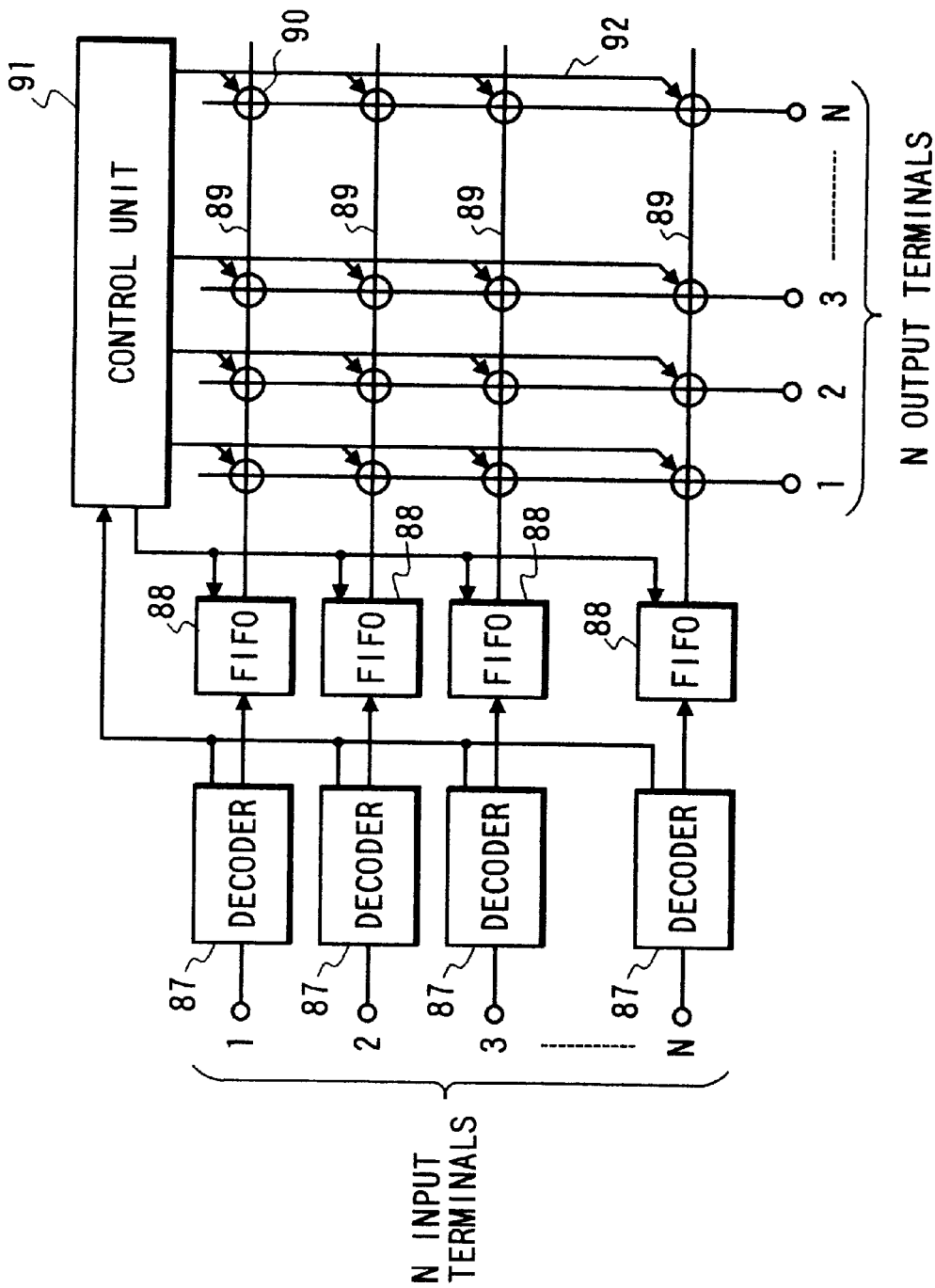
FIG. 14 is a drawing to show the electric switch of 8×8 in the first conventional example.
Figure 15:
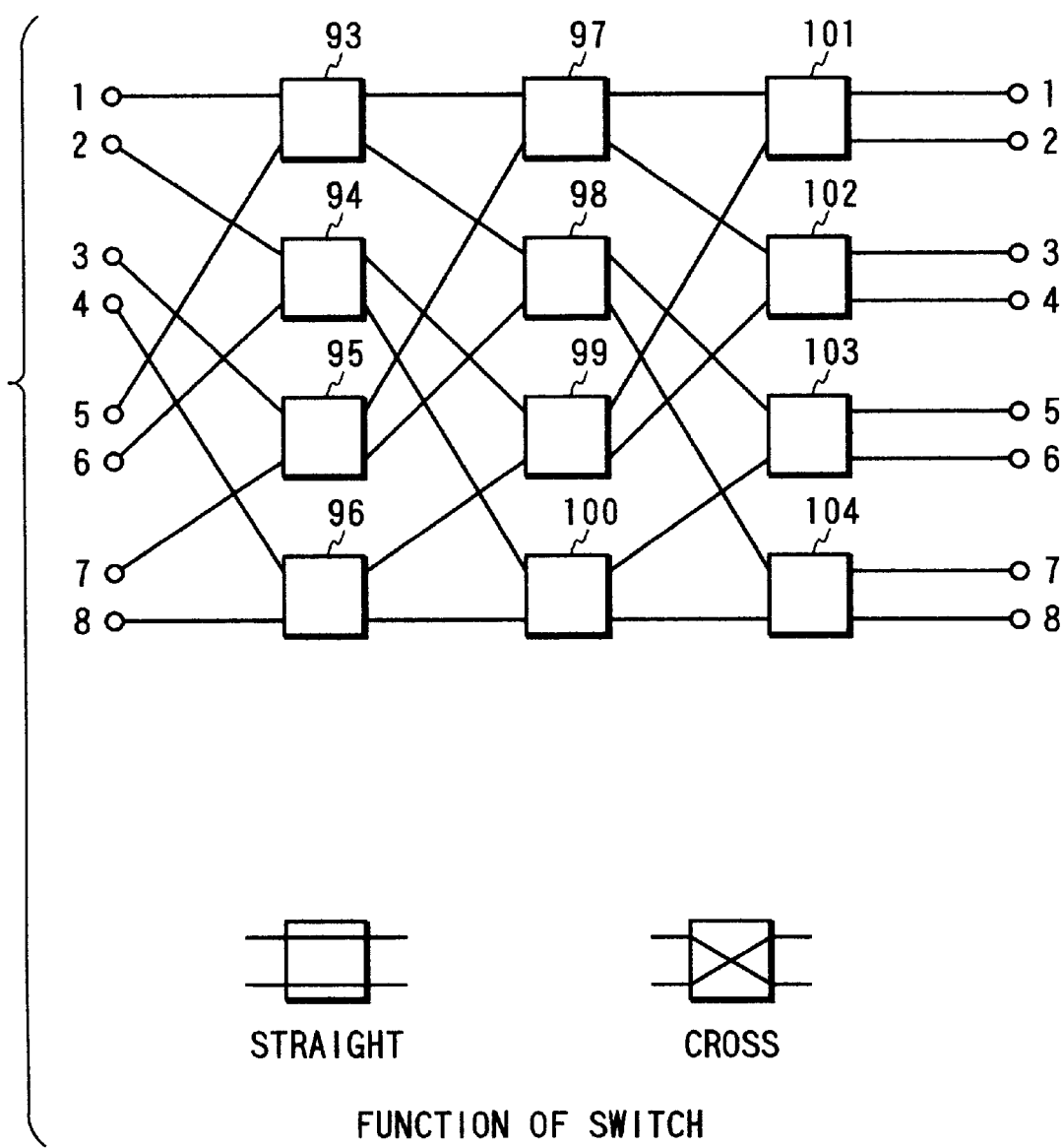
FIG. 15 is a drawing to show the electric switch of 8×8 in the second conventional example.
Figure 16:
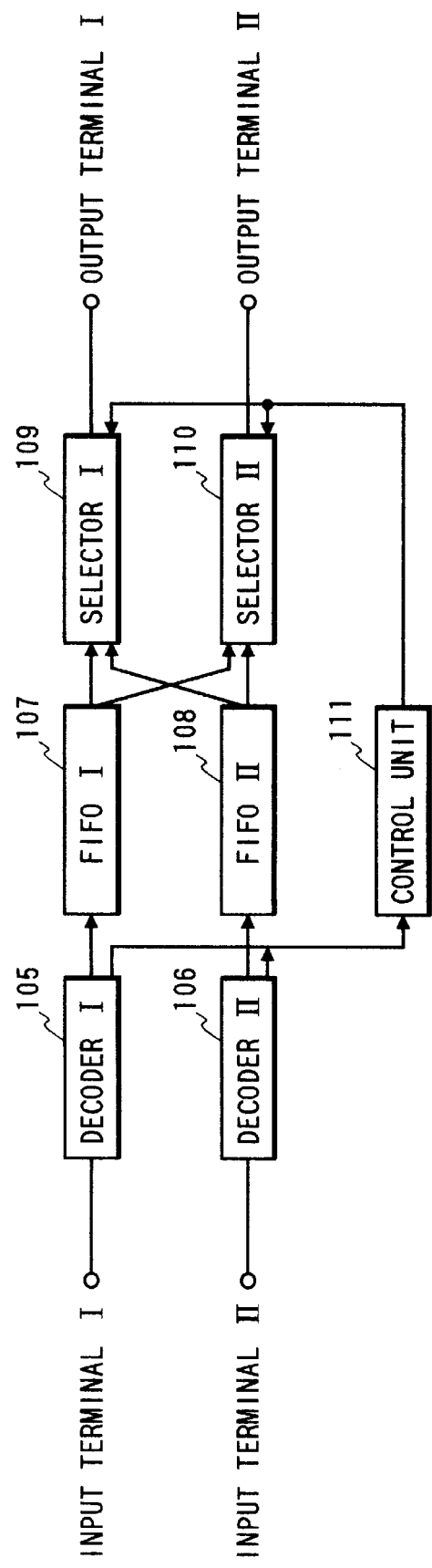
FIG. 16 is a drawing to show the electric switch of 2×2 in the second conventional example.
Figure 17A:
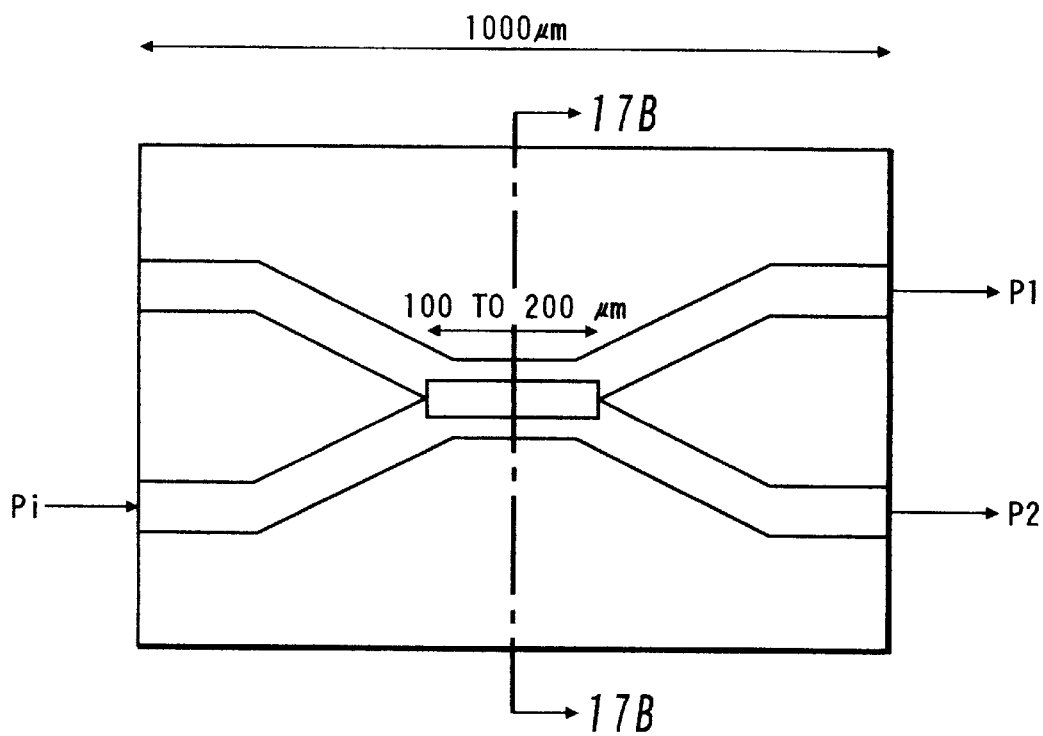
FIGS. 17A and 17B are drawings to show the optical switch of 2×2 in the third conventional example.
Figure 17B:
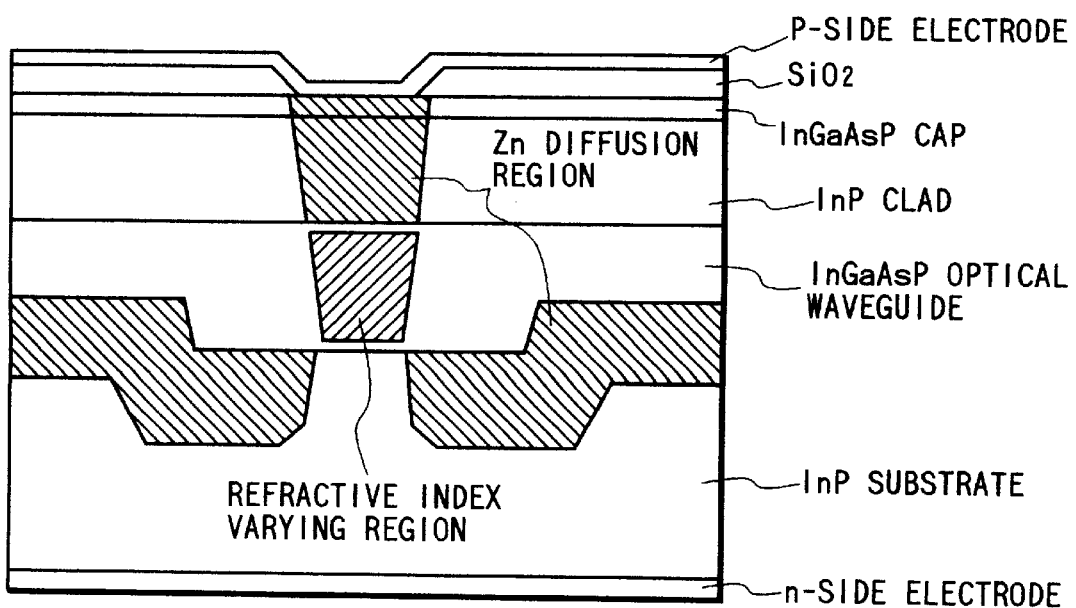

FIG. 12 is a drawing to show the internal configuration of the connection alteration unit used in the present embodiment. The connection alteration unit has four input terminals and four output terminals. In FIG. 12 numerals 1201 to 1204 are selector I to selector IV. Each of the selector I to selector IV receives four input signals through the input terminal I to input terminal IV and outputs a packet supplied from a predetermined input terminal to the output terminal, based on the select signal outputted from the connection alteration control unit. This sets the relation of connection between the input terminals and the output terminals.

The terminal units in the present embodiment are constructed in the same configuration as in Embodiment 1.

In this third embodiment the contents of the aforementioned connection control table I to connection control table IV are set as shown in Table 6 below.

Table 6 shows input terminals selected by each selector I, II, III, IV of the connection alteration unit, based on the control of the connection control unit. Further, the aforementioned management tables are set as shown in Table 5 and these tables are read in synchronization by the ROM counter. Accordingly, outputs from the respective memory units are converted and outputted at the predetermined wavelengths successively in circulation in the order of the fixed wavelength transmitting unit I, fixed wavelength transmitting unit II, fixed wavelength transmitting unit III, and fixed wavelength transmitting unit IV.

In Table 5 and Table 6, control is such that when the connection destination of the alteration connection unit is the fixed wavelength transmitting unit I for outputting the signal at the wavelength λ1, the partial video signal for the terminal equipment I is read out of each memory unit; when the connection destination of the connection control unit is the fixed wavelength transmitting unit II, fixed wavelength transmitting unit III, or fixed wavelength transmitting unit IV, the partial video signal corresponding to a request of the terminal equipment II, terminal equipment III, or terminal equipment IV is read out respectively.

The operation of the third embodiment of the present invention will be described referring to FIGS. 9A and 9B, FIG. 10, FIG. 11, FIG. 12, FIG. 5 and the time chart of Table 7 below with an example in which at the time T1 the terminal equipment I generates a request for delivery of continuous video signal A and, at the same time as it, the terminal equipment IV generates a request for delivery of continuous video signal C, in which at the next time T2 the terminal equipment II generates a request for delivery of continuous video signal B, and in which at the time T7 the terminal equipment III further generates a request for delivery of the continuous video signal A being under delivery.

In the following description the components having the same internal configurations will be denoted by the same reference symbols as those shown in FIGS. 9A and 9B, FIG. 10 to FIG. 12 and FIG. 5 for convenience' sake.

TABLE 5

| Address (entry) | 0 | 1 | 2 | 3 |
|---|---|---|---|---|
| Management table I | I | II | III | IV |
| Management table II | IV | I | II | III |
| Management table III | III | IV | I | II |
| Management table IV | II | III | IV | I |

TABLE 6

| Address (entry) | 0 | 1 | 2 | 3 |
|---|---|---|---|---|
| Connection control table I (selector I) | I | II | III | IV |
| Connection control table II (selector II) | IV | I | II | III |
| Connection control table III (selector III) | III | IV | I | II |
| Connection control table IV (selector IV) | II | III | IV | I |

TABLE 7

| Time | T1 | T2 | T3 | T4 | T5 | T6 | T7 | T8 |
|---|---|---|---|---|---|---|---|---|
| Counter output | 0 | 1 | 2 | 3 | 0 | 1 | 2 | 3 |
| Management table I | I | II | III | IV | I | II | III | IV |
| Management table II | IV | I | II | III | IV | I | II | III |
| Management table III | III | IV | I | II | III | IV | I | II |
| Management table IV | II | III | IV | I | II | III | IV | I |
| Memory unit I (connection of input terminal I) | a1 | b1 | — | c4 | a5 | b5 | a1 | c8 |
| Memory unit II (connection of input terminal II) | c1 | a2 | b2 | — | c5 | a6 | b6 | a2 |
| Memory unit III (connection of input terminal III) | — | c2 | a3 | b3 | — | c6 | a7 | b7 |
| Memory unit IV (connection of input terminal IV) | — | — | c3 | a4 | b4 | — | c7 | a8 |
| Input terminal selected by selector I | I | II | III | IV | I | II | III | IV |
| Input terminal selected by selector II | IV | I | II | III | IV | I | II | III |
| Input terminal selected by selector III | III | IV | I | II | III | IV | I | II |
| Input terminal selected by selector IV | II | III | IV | I | II | III | IV | I |
| Terminal equipment I | a1 | a2 | a3 | a4 | a5 | a6 | a7 | a8 |
| Terminal equipment II | — | b1 | b2 | b3 | b4 | b5 | b6 | b7 |
| Terminal equipment III | — | — | — | — | — | — | a1 | a2 |
| Terminal equipment IV | c1 | c2 | c3 | c4 | c5 | c6 | c7 | c8 |

When the terminal equipment I generates a request for reproduction of continuous video signal A at the time T0 prior to the time T1, the control command processing unit analyzes this request for reproduction and instructs the sequence management unit to set the management table I to management table IV. Receiving this instruction, the sequence management unit registers the continuous video signal A as a continuous video signal to be reproduced in the entry corresponding to the terminal equipment I in the management table I and, at the same time as it, performs initial setting of the sequence number to 1. Also, the continuous video signal A is registered as a continuous video signal to be reproduced in the entry corresponding to the terminal equipment I in the management table II and, at the same time as it, the sequence number is initially set to 2. Further, the continuous video signal A is also registered as a continuous video signal to be reproduced in the entry corresponding to the terminal equipment I in the management table III and the sequence number is initially set to 3. Similarly, the continuous video signal A is also registered as a continuous video signal to be reproduced in the entry corresponding to the terminal equipment I in the management table IV and the sequence number is initially set to 4.

In the same manner, in response to a request for reproduction of the continuous video signal C from the terminal equipment IV at the time T0, the sequence management unit registers the continuous video signal C as a continuous video signal in the entries of terminal equipment IV in the management table I to management table IV and further sets the sequence number of the entry corresponding to the terminal equipment IV in the management table II to 1 and the sequence numbers of the entries corresponding to the terminal equipment IV in the management table III, management table IV, and management table I to 2, 3, and 4, respectively.

According to these settings, at the time T1 the counter of the wavelength control unit outputs 0 as a read address value simultaneously to the connection control tables I to IV. The contents of the connection control tables are read out by this address value. The contents read out at this time are as shown in Table 6 described before; a control signal for selecting the output to the fixed wavelength transmitting unit I for transmitting the signal at the wavelength $\lambda 1$ is read out of the connection control table I; similarly, control signals for selecting the output to the fixed wavelength transmitting units II, III, and IV for transmitting the signal at the wavelength $\lambda 2$, $\lambda 3$, or $\lambda 4$, respectively, are read out of the connection control tables II, III, and IV.

At the same time as it, the read address value 0 outputted from the counter of the connection control unit is supplied to the management tables of the memory section controlling unit at the operating time T1. The contents of the management tables I to IV are read out by this address value.

The contents read out at this time are as shown in Table 5 described previously; the continuous video signal and sequence number corresponding to the terminal equipment I are read out of the management table I; and the continuous video signal and sequence number corresponding to the terminal equipment IV, the terminal equipment III, or the terminal equipment II are read out of the management table II, the management table III, or the management table IV, respectively. It is noted here that the continuous video signals and sequence numbers corresponding to the terminal equipment III and terminal equipment II are not registered at this point of time. The continuous video signal name A and sequence number 1 corresponding to the terminal equipment I, read out of the management table I, are supplied to the configuration table I and information is obtained concerning the position of location in the memory unit I, whereby the partial video signal a1 is reproduced from the memory unit I to be outputted to the signal processing unit I. The partial video signal a1 supplied to the signal processing unit I is outputted to the input terminal I of the connection alteration unit. Since at this time a selector to select the input terminal I is the selector I connected to the output terminal I as shown in Table 7, the partial video signal a1 is outputted through the output terminal I to the fixed wavelength transmitting unit I. Since the transmission wavelength of the fixed wavelength transmitting unit I is set to $\lambda 1$, the partial video signal a1 is outputted in the form of an optical signal of the wavelength $\lambda 1$ to the star coupler. The partial video signal a1 of the wavelength $\lambda 1$ outputted to the star coupler is then outputted to the optical fiber I to optical fiber IV. Since the filters of the terminal equipment I to terminal equipment IV are set so as to transmit only $\lambda 1$, $\lambda 2$, $\lambda 3$, and $\lambda 4$, respectively, as described above, the partial video signal a1 sent out in the form of the optical signal of the wavelength $\lambda 1$ is transmitted by only the filter of terminal equipment I to be received by only the receiving unit of terminal equipment I and then is converted to a desired video signal in the video processing unit to be displayed in the display unit.

Similarly, the continuous video signal C and sequence number 1 corresponding to the terminal equipment IV, read out of the management table II, are supplied to the configuration table II and information is obtained concerning the position of location in the memory unit II, whereby the partial video signal c1 is reproduced from the memory unit II. Then the partial video signal c1 is converted to an output signal to the fixed wavelength transmitting unit IV by the signal processing unit II and the output signal is outputted to the input terminal II of the connection alteration unit. Since in the connection alteration unit a selector to select the input terminal II is the selector IV connected to the output terminal IV, the partial video signal c1 is outputted through the output terminal IV to the fixed wavelength transmitting unit IV.

Since the transmission wavelength of the fixed wavelength transmitting unit IV is set to λ4, the partial video signal c1 is outputted in the form of an optical signal of the wavelength λ4 to the star coupler and the optical signal is further outputted to the optical fiber I to optical fiber IV. Since only the filter of terminal equipment IV transmits the optical signal of the wavelength λ4 as described above, the partial video signal c1 sent out in the form of the optical signal of wavelength λ4 is received by only the receiving unit of terminal equipment IV and then is converted to a desired video signal by the video processing unit to be displayed in the display unit.

Before the end of time T1 the sequence management unit performs the updating process to add 4 to the values in the sequence number column corresponding to the terminal equipment I of management table I and in the sequence number column corresponding to the terminal equipment IV of management table II from which the sequence numbers were read out.

At the time T1, similarly, in response to a request for reproduction of the continuous video signal B from the terminal equipment II, the sequence management unit registers the continuous video signal B as a continuous video signal in the entries of terminal equipment II in the management table I to management table IV and further sets the sequence number of the entry corresponding to the terminal equipment II in the management table I to 1 and the sequence numbers of the entries corresponding to the terminal equipment II in the management table II, management table III, and management table IV to 2, 3, and 4, respectively.

At the time T2, the outputs from the connection control table I to connection control table IV of the connection control unit are control signals to indicate II as an input terminal to be selected by the selector I of the connection control unit, to indicate I as an input terminal to be selected by the selector II of the connection control unit, to indicate IV as an input terminal to be selected by the selector III of the connection control unit, and to indicate III as an input terminal to be selected by the selector IV of the connection control unit. On the other hand, the continuous video signal names and sequence numbers to be delivered to the terminal equipment II, terminal equipment I, terminal equipment IV, and terminal equipment III are read out of the management table I to management table IV, respectively, of the memory section controlling unit to be outputted to the configuration tables. Information of location of desired partial video signals is outputted from the configuration tables. This causes the partial video signals b1, a2, c2 to be read out of the memory unit I to memory unit III, respectively. At this time there is no partial video signal read out of the memory unit IV. The partial video signals b1, a2, c2 are converted to optical signals of λ2, λ1, and λ4, respectively, in the fixed wavelength transmitting unit II, fixed wavelength transmitting unit I, and fixed wavelength transmitting unit IV through the connection control unit and each optical signal is outputted through the star coupler and optical fiber to each terminal equipment. The partial video signal a2 transmitted in the form of the optical signal of the wavelength λ1 is received and displayed by the terminal equipment I. On the other hand, the partial video signal b1 and partial video signal c2 transmitted at the respective wavelengths λ2 and λ4 are received and displayed by the terminal equipment II and by the terminal equipment IV, respectively.

In the same manner as at the time T1, before the end of the time T2 the sequence management unit performs the updating process to add 4 to the values in the sequence number column corresponding to the terminal equipment II of management table I, in the sequence number column corresponding to the terminal equipment I of management table II, and in the sequence number column corresponding to the terminal equipment IV of management table III from which the sequence numbers were read out.

At the next time T3, the continuous video signal names and sequence numbers to be delivered to the terminal equipment II, terminal equipment I, and terminal equipment IV are read out of the management table II, management table III, and management table IV, respectively; the partial video signals b2, a3, and c3 are read out of the memory unit II, memory unit III, and memory unit IV, respectively; the partial video signals are converted to optical signals of the wavelengths λ2, λ1, and λ4, respectively, in the fixed wavelength transmitting unit II, fixed wavelength transmitting unit III, and fixed wavelength transmitting unit IV through the connection alteration unit; and each optical signal is transmitted to the corresponding terminal equipment. After that, the partial video signal a3 transmitted at the wavelength λ1 is received and displayed by the terminal equipment I. The partial video signal b2 transmitted at the wavelength λ2 is received and displayed by the terminal equipment IV and the partial video signal c3 transmitted at the wavelength λ4 is received and displayed by the terminal equipment IV.

Delivery processes at times T4, T5, and T6 will be carried out thereafter in the same manner.

When at the time T6 the terminal equipment III generates a request for delivery of the continuous video signal A being under delivery, the sequence management unit registers the continuous video signal A as a continuous video signal in the entries of terminal equipment III in the management table I to management table IV and further sets the sequence number of the entry corresponding to the terminal equipment III in the management table I to 1 and the sequence numbers of the entries corresponding to the terminal equipment II in the management table II, management table III, and management table IV to 2, 3, and 4, respectively.

According to this setting, at the time T7 the partial video signal a1 to be delivered to the terminal equipment III is read out of the memory unit I; it is converted to an optical signal of the wavelength λ3 in the fixed wavelength transmitting unit III through the connection alteration unit; the optical signal is then transmitted to the terminal equipment III; thereafter the partial video signal a1 is received and displayed by the terminal equipment III. At this time, for the terminal equipment I having already being receiving delivery of continuous video signal A, the partial video signal a7 is read out of the memory section III and is transmitted in the form of an optical signal of the wavelength λ1 from the fixed wavelength transmitting unit I. The optical signal is received by only the terminal equipment I. Although the terminal equipment I and the terminal equipment III requests delivery of the same continuous video signal as described, the delivery can be carried out simultaneously to the terminal equipment I and to the terminal equipment III, because the memory units of the partial video signals to be delivered are different and the wavelengths of the optical signals used upon delivery are also different.

A server system with radio wave signals can be constructed in the same manner as in Embodiment 2, by modifying the configuration of this embodiment in such a way that the terminal units are replaced by those used in Embodiment 2 and the fixed wavelength transmitting units I to IV of FIGS. 9A and 9B are those for transmitting signals of mutually different modulation frequencies. In this case the star coupler 913 and optical fibers I to IV of FIGS. 9A and 9B are not necessary.

The embodiments described above were arranged to establish the plurality of simultaneously usable channels by wavelength division multiplex or by modulation frequency multiplex, but it is clear that the scope of application of the present invention is not limited to these. A variety of methods can be employed for establishing the plurality of simultaneously usable channels. For example, the present invention can also employ the configuration for discriminating the channels by codes like the so-called CDMA (code division multiple access) method or SS (spread spectrum) method of multiplexing of spread codes. For example, in the configuration like Embodiment 3, the output terminals of the connection alteration unit may be connected to different terminal units by separate transmission paths, and in this case the transmission paths are used as simultaneously usable channels.

In the server systems of the present invention, as described above, the control is easy, especially, upon start of delivery with a channel from a state in which delivery is performed with another channel. The present invention does not require execution of arbitration control for every reading of partial signal. Since the terminal units can be connected simultaneously to different storing/reproducing means (i.e., since the storing/reproducing means can be connected simultaneously to different channels), the arbitration does not have to be conducted between the terminal units (or between the storing/reproducing means). The configuration using the variable channel transmitting means can perform delivery of signal without use of the well-known switching devices. Even if the well-known switching devices are used, the arbitration control is unnecessary when the relation of connection is preliminarily set between the plural terminal units and the plural storing/reproducing means as in the present invention. The load of control is thus very small. It is also unnecessary to identify a destination for each signal by the switching system.

What is claimed is:

1. A server system for delivery of a signal, comprising:
   a connection unit adapted to connect to a plurality of memory units in which data is stored;
   a plurality of reproducing units adapted to reproduce the data in time-sequence and to output the data, which is stored dispersedly and in time-sequence in the plurality of memory units; and
   an altering unit adapted to alter channels for permitting respective ones of said plurality of reproducing units to output the data according to a predetermined pattern, so that said plurality of reproducing units outputs the data to different channels simultaneously while a sequence of the dispersedly-stored data is outputted to a same channel.

2. A server system according to claim 1, wherein
   said altering unit includes a plurality of variable channel transmitting units each corresponding to said plurality of reproducing units,
   channels for permitting the plurality of variable channel transmitting units each to output signals are successively altered so that respective ones of the plurality of variable channel transmitting units can output signals to different channels simultaneously, and
   outputting of signals from respective ones of said plurality of reproducing units is carried out according to the channels to which the plurality of variable channel transmitting units respectively corresponding to said plurality of reproducing units can output the signals.

3. A server system according to claim 1, wherein
   said altering unit includes input terminals respectively corresponding to said plurality of reproducing units and output terminals respectively corresponding to different channels,
   the input terminals respectively connected with said the output terminals are successively altered so that plural input terminals can be connected with different output terminals simultaneously, and
   outputting of signals from respective ones of said plurality of reproducing units is carried out according to the output terminals to which the input terminals respectively corresponding to said plurality of reproducing units are connected.

4. A server system according to claim 1, wherein the predetermined pattern is a pattern preliminarily set so that terminal units can access different ones of said plurality of reproducing units simultaneously.

5. A server system for delivery of a signal, comprising:
   a connection unit adapted to connect to a plurality of memory units in which data is stored;
   a plurality of reproducing units adapted to reproduce the data in time-sequence and to output the data, which is stored dispersedly and in time-sequence in the plurality of memory units;
   a plurality of terminal units adapted to receive the data outputted from said plurality of reproducing units; and
   an altering unit adapted to always alter said plurality of reproducing units that said plurality of terminal units can respectively access, while permitting said plurality of terminal units to respectively access different ones of said plurality of reproducing units simultaneously and to output a sequence of the dispersedly-stored data to a same terminal unit.

6. A server system according to claim 5, wherein
   said altering unit includes a plurality of variable channel transmitting units each corresponding to said plurality of reproducing units,
   channels for permitting the plurality of variable channel transmitting units each to output signals are successively altered so that respective ones of the variable channel transmitting units can output signals to different channels simultaneously, and
   outputting of signals from respective ones of said plurality of reproducing units is carried out according to the channels to which the plurality of variable channel transmitting units respectively corresponding to said plurality of reproducing units can output the signals.

7. A server system according to claim 5, wherein
   said altering unit includes input terminals respectively corresponding to said plurality of reproducing units and output terminals each respectively corresponding to different channels,
   the input terminals respectively connected with the output terminals are successively altered so that plural input terminals can be connected with different output terminals simultaneously, and
   outputting of signals from respective ones of said plurality of reproducing units is carried out according to the output terminals to which the input terminals respectively corresponding to said plurality of reproducing units are connected.

8. A server system according to claim 5, wherein the altering is carried out according to a predetermined pattern.

9. A server system according to claim 8, wherein the predetermined pattern is a pattern preliminarily set so that terminal units can access different ones of said plurality of reproducing units simultaneously.

10. A server system for delivery of a signal, comprising:
a connection unit adapted to connect to a plurality of memory units in which data is stored;
a plurality of reproducing units adapted to reproduce the data in time-sequence and to output the data, which is stored dispersedly and in time-sequence in the plurality of memory units;
a plurality of variable channel transmitting units respectively provided corresponding to said plurality of reproducing units, said plurality of variable channel transmitting units adapted to alter channels for outputting the data from respective ones of said plurality of reproducing units so that the respective ones of the plurality of reproducing units output the data to different channels simultaneously while a sequence of the dispersedly-stored data is outputted to a same channel; and
terminal equipment adapted to receive any one of the mutually different channels.

11. A server system according to claim 10, wherein the altering is carried out according to a predetermined pattern.

12. A server system according to claim 11, wherein the predetermined pattern is a pattern preliminarily set so that terminal units can access different ones of said plurality of reproducing units simultaneously.

13. A method of delivering a signal from a reproducing unit to terminal equipment in a server system that comprises a plurality of reproducing units adapted to reproduce in time-sequence and to output data reproduced in time-sequence from data being stored dispersedly and in time-sequence in a plurality of memory units, and terminal equipment for receiving the data outputted from the plurality of reproducing units, said method comprising the steps of:
altering channels for permitting respective ones of the plurality of reproducing units to output data according to a predetermined pattern so that the respective ones of the plurality of reproducing units output the data to different channels simultaneously, and a sequence of the dispersedly-stored data is outputted to a same channel; and
performing outputting of the data from the plurality of reproducing units in accordance with the channels in order to permit the respective ones of the plurality of reproducing units to output the data.

14. A method according to claim 13, wherein,
in a case where the terminal equipment is set to receive a first channel of the different channels, when a first reproducing unit of the plurality of reproducing units can output a signal through the first channel, a first partial signal in a continuous signal is outputted from the first reproducing unit, and
when a second reproducing unit of the plurality of reproducing units becomes capable of outputting a signal through the first channel, a second partial signal that is a signal next in sequence to the first partial signal is outputted from the second reproducing unit.

15. A method of delivering a signal from a reproducing unit to terminal equipment in a server system that comprises a plurality of reproducing units adapted to reproduce in time-sequence and to output data stored dispersedly and in time-sequence in a plurality of memory units, and a plurality of terminal units adapted to receive the data outputted from the plurality of reproducing units, said method comprising the steps of:
always altering the plurality of reproducing units that can respectively access the plurality of terminal units so as to permit the plurality of terminal units to access different ones of the plurality of reproducing units simultaneously and to output a sequence of the dispersedly-stored data to a same terminal unit; and
performing outputting of the data from respective ones of the plurality of reproducing units in accordance with the plurality of terminal units that respectively access the plurality of reproducing units.

16. A delivery method according to claim 15, wherein
when a first terminal unit of the plurality of terminal units can access a first reproducing unit of the plurality of reproducing units, a first partial signal in a continuous signal is outputted from the first reproducing unit, and
when the first reproducing unit that the first terminal unit can access is altered to a second reproducing unit of the plurality of reproducing units, a second partial signal that is a signal next in sequence to the first partial signal is outputted from the second reproducing unit.

17. A method of delivering a signal from a reproducing unit to terminal equipment in a server system comprising a plurality of reproducing units adapted to reproduce in time-sequence and to output data reproduced in time-sequence from data stored dispersedly and in time-sequence in a plurality of memory units, and terminal equipment adapted to receive the data outputted from the plurality of reproducing units, said method comprising the steps of:
preparing a plurality of variable channel transmitting units respectively corresponding to the plurality of reproducing units, the plurality of variable channel transmitting units altering channels for outputting the data from respective ones of the plurality of reproducing units so that the respective ones of the plurality of reproducing units output the data to different channels simultaneously and a sequence of the dispersedly-stored data is outputted to a same channel; and
performing outputting of the data from respective ones of the plurality of reproducing units in accordance with channels through which the plurality of variable channel transmitting units corresponding to the respective ones of the plurality of reproducing units can output the data.

18. A method according to claim 17, wherein,
in a case where the terminal equipment is set so as to receive a first channel of the different channels, when a first variable channel transmitting unit corresponding to a first reproducing unit of the plurality of reproducing units can output a signal through the first channel, a first partial signal in a continuous signal is outputted from the first reproducing unit, and
when a second variable channel transmitting unit corresponding to a second reproducing unit out of the plurality of reproducing units becomes capable of outputting a signal through the first channel, a second partial signal that is a signal next in sequence to the first partial signal is outputted from the second reproducing unit.

* * * * *

UNITED STATES PATENT AND TRADEMARK OFFICE
CERTIFICATE OF CORRECTION

PATENT NO. : 6,259,702 B1
DATED : July 10, 2001
INVENTOR(S) : Mitsuru Yamamoto

Page 1 of 1

It is certified that error appears in the above-identified patent and that said Letters Patent is hereby corrected as shown below:

<u>Title page,</u>
Item [56], References Cited insert:
-- FOREIGN PATENT DOCUMENTS    3-58348    3/1991    Japan --.

<u>Column 14,</u>
Line 8, "time as it," should read -- time, --.

<u>Column 17,</u>
Line 65, "In" should read -- ¶ In FIG. 6 numerals 56 to 59 are terminal units, the internal configuration of which is shown in FIG. 8. ¶In --.

<u>Column 26,</u>
Line 8, "said" should be deleted.

Signed and Sealed this

Fourteenth Day of May, 2002

*Attest:*

*Attesting Officer*

JAMES E. ROGAN
*Director of the United States Patent and Trademark Office*